US012591825B2

(12) United States Patent    (10) Patent No.:   US 12,591,825 B2

Man et al.    (45) Date of Patent:   Mar. 31, 2026

(54) COMPUTING SYSTEM AND METHOD FOR PROGRESS TRACKING USING A LARGE LANGUAGE MODEL

(71) Applicant: Procore Technologies, Inc., Carpinteria, CA (US)

(72) Inventors: Matt Man, Thornhill (CA); Farid Mirahadi, North York (CA); Hunter Buckhorn, Santa Barbara, CA (US); Mohammad Mostafa Soltani, Toronto (CA); Patavee Meemeng, Los Angeles, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 18/601,320

(22) Filed: Mar. 11, 2024

(65) Prior Publication Data

US 2025/0285047 A1    Sep. 11, 2025

(51) Int. Cl.
*G06Q 10/0631*    (2023.01)
*G06Q 50/08*    (2012.01)

(52) U.S. Cl.
CPC ................ *G06Q 10/063114* (2013.01); *G06Q 10/06316* (2013.01); *G06Q 50/08* (2013.01)

(58) Field of Classification Search
CPC ............. G06Q 10/063; G06Q 10/0631; G06Q 10/06311; G06Q 10/063114; G06Q 10/06316; G06Q 50/08
See application file for complete search history.

(56) References Cited

U.S. PATENT DOCUMENTS

| | | | |
|---|---|---|---|
| 11,875,123 B1 | 1/2024 | Ben David et al. | |
| 2019/0377602 A1* | 12/2019 | Mosca ............... | G06Q 10/0635 |
| 2022/0391803 A1* | 12/2022 | Alamir .................. | G06N 20/00 |
| 2023/0153716 A1 | 5/2023 | Kumar | |
| 2023/0229986 A1 | 7/2023 | Cami et al. | |
| 2024/0168860 A1* | 5/2024 | Arlitt .................. | G06F 11/3447 |

(Continued)

FOREIGN PATENT DOCUMENTS

| | | |
|---|---|---|
| CN | 116910104 A | 10/2023 |
| KR | 10-2023-0091419 A | 6/2023 |

OTHER PUBLICATIONS

Singh, Akarsth Kumar, et al. "Prospects of integrating BIM and NLP for automatic construction schedule management." ISARC. Proceedings of the International Symposium on Automation and Robotics in Construction. vol. 40. IAARC Publications, 2023. (Year : 2023).*

(Continued)

*Primary Examiner* — William S Brockington, III

(74) *Attorney, Agent, or Firm* — Lee Sullivan Shea & Smith LLP

(57) ABSTRACT

A computing platform is configured to (i) load source data comprising (a) a set of log entries of a construction project and (b) a schedule of the construction project, (ii) preprocess the source data, (iii) provide the preprocessed source data as input to a large-language model (LLM) that is configured to generate insights related to progress tracking and thereby determine one or more insights related to progress tracking for the construction project, and (iv) cause the one or more insights to be presented to one or more individuals involved in the construction project.

20 Claims, 12 Drawing Sheets

(56) References Cited

U.S. PATENT DOCUMENTS

2025/0094707 A1 * 3/2025 Portisch ................ G06F 40/284
2025/0245444 A1 * 7/2025 Bakshi ................... G06F 40/40

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.
International Searching Authority, PCT International Search Report and Written Opinion, PCT International Application No. PCT/US2025/019375, Jun. 23, 2025, 9 pages.

* cited by examiner

400

| Task Name | 3/1-3/14 Summary |
|---|---|
| HM Frame Procurement | The procurement of HM Frame was scheduled during this period. No specific progress or issues were reported in the logs. |
| Door & Hardware Procurement | The procurement of Door & Hardware was scheduled during this period. There was a note on 3/10 that only Doors were remaining. |
| Carpet Procurement | The procurement of Carpet was scheduled during this period. C1 and C3 were reported to be in hand, while C2 for the conference center was expected by 5/21. |
| Shop Drawings Required | Shop drawings were required during this period. No specific progress or issues were reported in the logs. |
| Metalux Procurement | The procurement of Metalux was scheduled during this period. L7 and R5 were reported to be in hand, while R6 was remaining. |
| Acoustical Baffle Procurement | The procurement of Acoustical Baffle was scheduled during this period. Rev 2 was submitted. |
| Heat Pump Procurement | The procurement of Heat Pump was scheduled during this period. No specific progress or issues were reported in the logs. |
| Plumbing Rough In | The Plumbing rough-in was scheduled during this period. No specific progress or issues were reported in the logs. |

| Task Name | First Floor Summary |
|---|---|
| Insulation Procurement | The procurement of Insulation was scheduled during this period. No specific progress or issues were reported in the logs. |
| Door & Hardware Procurement | The procurement of Door & Hardware was scheduled during this period. There was a note on 3/10 that only Doors were remaining. |
| Carpet Procurement | The procurement of Carpet was scheduled during this period. C1 and C3 were reported to be in hand, while C2 for the conference center was expected by 5/21. |
| Tele/Data Rough-In | The Tele/Data rough-in was scheduled during this period. No specific progress or issues were reported in the logs. |
| Metalux Procurement | The procurement of Metalux was scheduled during this period. L7 and R5 were reported to be in hand, while R6 was remaining. |
| Wall Base Procurement | The procurement of Wall Base was scheduled during this period. B1 and B3 were expected by 6/12. |
| Heat Pump Procurement | The procurement of Heat Pump was scheduled during this period. No specific progress or issues were reported in the logs. |
| Plumbing Rough In | The Plumbing rough-in was scheduled during this period. No specific progress or issues were reported in the logs. |

| Task Name | Electrical Summary |
|---|---|
| Electrical Wiring Installation | The installation of electrical wires was completed on 3/2. |
| Generator Procurement | The procurement of two generators was scheduled during this period. There was a note on 3/10 that only one generator remained. |
| MEP Fixtures & OH Inspection | The MEP Fixtures were scheduled to be installed during this period. Additionally, the OH inspection took place on 3/18 |
| Light Fixtures | The installation of light fixtures was completed on 3/17. |
| Final Inspections | Final inspections were scheduled during this period. No specific progress or issues were reported in the logs. |

| Task Name | Assignee | Status | Start Date | End Date |
|---|---|---|---|---|
| Install Floor Insulation | Friendly Franklin | Initiated | N/A | N/A |
| Erect Structural Steel | Swanky Sarah | Ready For Review | 1/5/24 | N/A |
| Excavate Foundation | Handsome Harry | In Progress | 1/22/24 | N/A |
| Install Electrical | Disgruntled Bob | In Progress | 12/25/23 | N/A |

602

| Task Name | Assignee | Status | Start Date | End Date |
|---|---|---|---|---|
| Install Floor Insulation | Friendly Franklin | In Progress | 1/25/24 | N/A |
| Erect Structural Steel | Swanky Sarah | Complete | 1/5/24 | 2/5/24 |
| Excavate Foundation | Handsome Harry | Complete | 1/22/24 | 2/5/24 |
| Install Electrical | Disgruntled Bob | In Progress | 12/25/23 | N/A |

| Material | Quantity Delivered | Delivery Timeline | Quantity Installed | Installation Timeline |
|---|---|---|---|---|
| Wiring | 100 ft | Delivered on 1/22 | 0 ft | Installation scheduled for 2/12 |
| Breaker Panel | 2 units | Delivered on 1/2 | 2 units | Installation completed on 1/15 |
| Light Fixtures | 20 units | Delivery scheduled for 1/10 | 0 units | Installation scheduled for 2/12 |
| Outlets and Switches | 30 outlets, 20 switches | Delivered on 1/2 | 30 outlets, 0 switches | 30 outlets installed on 1/10, switches scheduled to be installed on 1/16 |

FIG. 8

COMPUTING SYSTEM AND METHOD FOR PROGRESS TRACKING USING A LARGE LANGUAGE MODEL

BACKGROUND

Construction projects are often complex endeavors involving the coordination of many professionals across several discrete phases. Such projects have multiple planning and building phases that occur and require lengthy communication. The planning phases may involve contract bidding, contractor selection, project feasibility studies, regulatory approval and/or permitting, among other known planning phases.

Typically, a construction project commences with a design phase, where architects design the overall shape and layout of a construction project, such as a building. Next, engineers engage in a planning phase where they take the architects' designs and produce engineering drawings and plans for the construction of the project. At this time, engineers may also design various portions of the project's infrastructure, such as HVAC, plumbing, electrical, etc., and produce plans reflecting these designs as well.

After, or perhaps in conjunction with, the planning phase, contractors may engage in a logistics phase to review these plans and begin to allocate various resources to the project, including determining what materials to purchase, scheduling delivery, and developing a plan for carrying out the actual construction of the project. Finally, during the construction or implementation phase, construction professionals begin to construct the project based on the finalized plans.

Such construction planning, design, and implementation may involve massive amounts of tasks that requires accurate documentation, coordination, and reporting. Software technology has been developed to enable electronic management of information associated with a construction project, which includes documenting events and information associated with tasks of a construction project.

SUMMARY

Disclosed herein is the new technology for progress tracking utilizing a large-language model (LLM).

In one aspect, the disclosed technology may take the form of a method that involves (i) loading source data comprising (a) a set of log entries of a construction project and (b) a schedule of the construction project, (ii) preprocessing the source data, (iii) providing the preprocessed source data as input to a large-language model (LLM) that is configured to generate insights related to progress tracking and thereby determining one or more insights related to progress tracking for the construction project, and (iv) causing the one or more insights to be presented to one or more individuals involved in the construction project.

In some example embodiments, the one or more insights may include various insights. For instance, as one possibility, the one or more insights may include textual summaries of a set of tasks included in the schedule of the construction project. As another possibility, the one or more insights may include predicted status indications for a set of tasks included in the schedule of the construction project. As yet another possibility, the one or more insights may include predicted start and end dates for a set of tasks included in the schedule of the construction project. As yet still another possibility, the one or more insights may include a status of a given type of material to be utilized for the construction project. As yet still another possibility, the one or more insights may include a proposed modification to the schedule of the construction project.

Further, in some example embodiments, the LLM is configured to generate multiple different types of insights related to progress tracking.

Further yet, in some example embodiments, the set of tasks may include various tasks. As one possibility, the set of tasks includes tasks related to a given location of the construction project. As another possibility, the set of tasks includes tasks related to a given trade.

In some example embodiments the function of preprocessing the source data may involve mapping the set of log entries to a schema for input into the LLM.

In another aspect, the disclosed technology may take the form of a computing system comprising at least one processor, at least one non-transitory computer-readable medium, and program instructions stored on the at least one non-transitory computer-readable medium that are executable by the at least one processor such that the computing platform is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 4A shows one possible example set of textual summaries that may be generated, according to the present disclosure.

FIG. 4B shows another possible example set of textual summaries that may be generated, according to the present disclosure.

FIG. 4C shows another possible example set of textual summaries that may be generated, according to the present disclosure.

FIG. 6 shows one possible example of schedule updates that may be generated in accordance with the disclosed software technology.

FIG. 8 shows one possible example of a status report for a given type of material that may be generated in accordance with the disclosed software technology.

Figure 1:
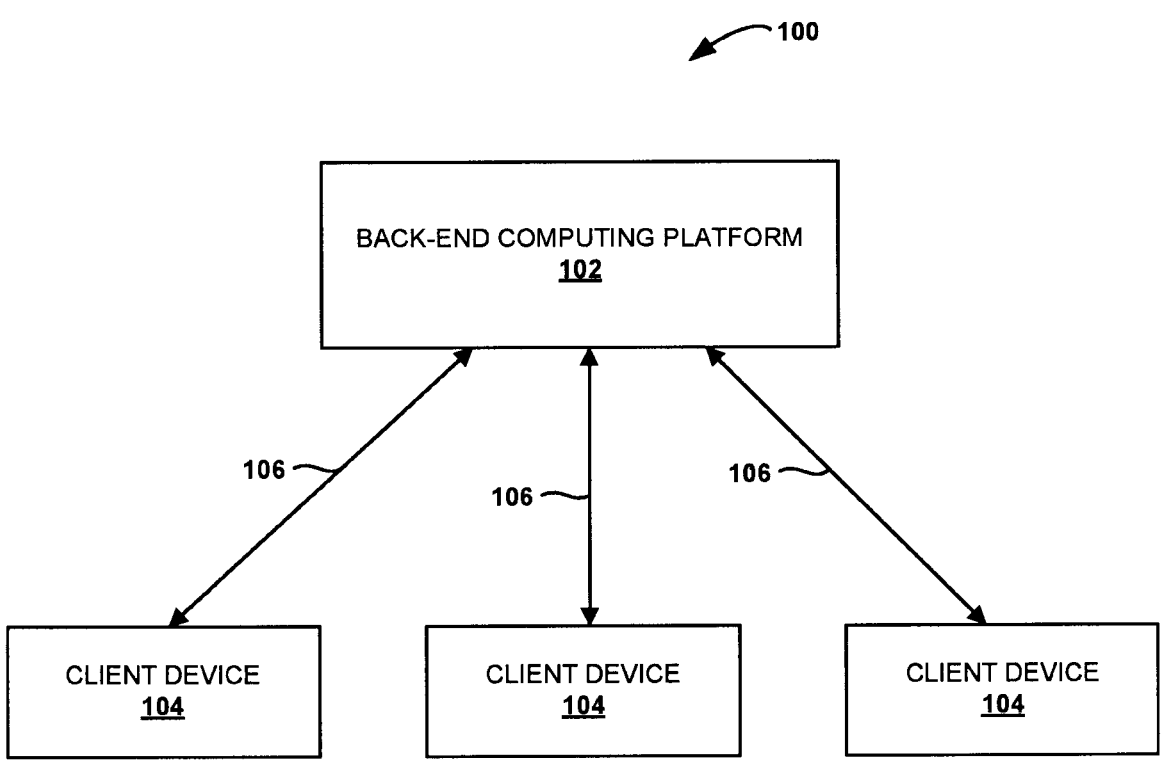
FIG. 1 depicts an example network configuration in which example embodiments may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure refers to the accompanying figures and several examples. A person of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

The present disclosure is generally directed to software technology for progress tracking. The disclosed software technology may be used in many different contexts, one of which is in connection with technology for managing construction projects. Construction project management today is often performed through the use of software applications, such as the software application provided by Procore Technologies, Inc.®, the applicant of the present disclosure. These software applications generally provide users the ability to create and store various types of data related to a construction project, such as schedules, daily logs, images, drawings, specifications, building information models (BIMs), sensor data, budgets, change orders, communications, invoices, directories, punch lists, timesheets, requests for information (RFIs), submittals, reports, and so forth.

In practice, these software applications may take various forms. As one possible implementation, a construction project management software application may include both front-end client software running on client stations that are accessible to individuals associated with construction projects (e.g., contractors, project managers, architects, engineers, designers, etc.) and back-end software running on a back-end platform (sometimes referred to as a "cloud" platform) that interacts with and/or drives the front-end software, and which may be operated (either directly or indirectly) by the provider of the front-end client software. As another possible implementation, a construction project management software application may include front-end client software that runs on client stations without interaction with a back-end platform. These software applications may take other forms as well.

In general, such front-end client software may provide users involved in a construction project with tools for managing the construction project as it progresses through different stages, for example by creating, editing, and tracking tasks of the construction project. Further, such front-end client software may take various forms, examples of which may include a native application (e.g., a mobile application) and/or a web application running on a client station, among other possibilities.

Turning now to the figures, FIG. 1 depicts an example network configuration 100 in which a construction project management software application may be implemented. As shown in FIG. 1, the network configuration 100 includes a back-end computing platform 102 that may be communicatively coupled to one or more client stations 104. Although the client stations 104 are depicted by three stations as shown for the sake of simplicity in illustration, it should be understood that the client stations 104 may represent more or less than three stations without departing from the spirit and scope of this disclosure.

Broadly speaking, the back-end computing platform 102 may comprise one or more computing systems that have been provisioned with software for carrying out the back-end functions disclosed herein, including but not limited to back-end functions for delivering a construction project management software application. The one or more computing systems of back-end computing platform 102 may take various forms and may be arranged in various manners.

For instance, as one possibility, the back-end computing platform 102 may comprise computing infrastructure of a public, private, and/or hybrid cloud (e.g., computing and/or storage clusters) that has been provisioned with software for carrying out one or more functions of a construction project management software application. In this respect, the entity that owns and operates the back-end computing platform 102 may supply its own cloud infrastructure or obtain the cloud infrastructure from a third-party provider of "on demand" computing resources, such as Amazon Web Services (AWS) or the like. As another possibility, the back-end computing platform 102 may comprise one or more dedicated servers that have been provisioned with software for carrying out one or more of the functions of the construction project management software application. Other implementations of the back-end computing platform 102 are possible as well.

In turn, the client stations 104 may each be any computing system that is capable of running front-end software of the construction project management software application. In this respect, the client stations 104 may each include hardware components such as a processor, data storage, a user interface, and a network interface, among others, as well as software components that facilitate the client station's ability to run the front-end software (e.g., operating system software, web browser software, etc.). As representative examples, the client stations 104 may each take the form of a desktop computer, a spatial computer, a laptop, a netbook, a tablet, a smartphone, and/or a personal digital assistant (PDA), among other possibilities.

As further depicted in FIG. 1, the back-end computing platform 102 is configured to interact with the client stations 104 over respective communication paths 106. In this respect, each communication path 106 between the back-end computing platform 102 and one of the client stations 104 may generally comprise one or more communication networks and/or communications links, which may take any of various forms. For instance, each respective communication path 106 with the back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 106 with the back-end computing platform 102 may be wireless, wired, or some combination thereof, and may carry data according to any of various different communication protocols. Although not shown, the respective communication paths 106 between the client stations 104 and the back-end computing platform 102 may also include one or more intermediate systems. For example, it is possible that the back-end computing platform 102 may communicate with a given client station 104 via one or more intermediary systems, such as a host server (not shown). Many other configurations are also possible.

Although not shown in FIG. 1, the back-end computing platform 102 may also be configured to receive data, such as data related to a construction project, from one or more external data sources, such as an external database and/or another back-end computing platform or platforms. Such data sources—and the data output by such data sources—may take various forms.

It should be understood that the network configuration 100 depicted in FIG. 1 is one example of a network configuration in a construction project management software application may be implemented. Numerous other arrangements are possible and contemplated herein. For instance, other network configurations may include additional components not pictured and/or more or fewer of the pictured components.

In line with the discussion above, existing construction project software management applications may enable users to create a schedule that defines a set of tasks to be performed on the construction project along with timing information indicating when such tasks are to be started and completed. Further, existing construction project software management applications may also enable users to input status updates for the scheduled tasks, such as an indication of how close to completion the task is. In practice, this indication may be presented in the format of a completion percentage (e.g., a "Second Floor Drywall" task may be 70% complete) or a categorization of the current status (e.g. in-progress, under review, completed, etc.), among other possibilities. Further yet, existing construction project software management applications may enable users to input status updates related to materials on a project, such as an amount of a given type of material that has been delivered or installed on the project. In this way, existing construction project software management applications provide users with some ability to memorialize the progress of the construction project.

However, given that construction projects often include a large number of tasks involving multiple different parties, cost codes, materials, etc., this approach of relying on users to track the progress of every individual task on a project and then input up-to-date, accurate, and complete status updates for every individual task is time and resource consuming, and at times can become impractical-particularly for large, complex construction projects. As a result, it is often the case that status information for scheduled tasks can become outdated, inaccurate, or incomplete for some period of time until such is updated by a user, which can lead to a number of other problems on the construction project, such as delays in generating invoices, delays in making payments to contractors, and so on. The same goes for the status of materials on a construction project.

Further, even if users could theoretically maintain up-to-date, accurate, and complete status information for the scheduled tasks on a construction project, that status information tends to be fairly limited. For instance, existing construction project software management applications may enable users to memorialize the progress of scheduled tasks in terms of how close to completion the task is, but existing construction project software management applications are typically not capable of providing any further details regarding the progress of the scheduled tasks. As a result, users may be required to backtrack and sift through hundreds or thousands of data entries that have been entered for the construction project in order to try and extract meaningful information regarding the progress of scheduled tasks, which is highly inefficient, error prone, and in many situations, simply infeasible. This problem is also compounded by the fact that existing construction project management software applications do not show evidence or supporting documentation related to the status updates made to scheduled tasks. So, when a user updates the status of a scheduled task, e.g., based on a review of various data records that have been stored for the construction project, the user does not have the ability to document the data entries that led to the determination to update the scheduled tasks. As a result, it may be difficult to validate the status updates made to scheduled tasks.

Further yet, existing construction project management software applications do not support functionality for automatically analyzing the data that has been stored for the construction project and generating meaningful information regarding the progress of scheduled tasks and/or project materials based on the analysis of the stored data. To address these and other shortcomings of existing construction project management software applications, disclosed herein is new software technology for generating insights related to progress tracking on a construction project using a large language model (LLM).

The disclosed software technology may take the form of a software pipeline comprising various functions, and may be implemented by a back-end computing platform, such as the back-end computing platform 102 of FIG. 1. At a high level, the disclosed software pipeline may comprise functionality for (i) loading source data that includes a set of log entries and one or more schedules of a construction project, (ii) preprocessing the loaded source data, for example, to restructure the loaded source data into a format that is usable by an LLM, and (iii) inputting the preprocessed source data into the LLM, which may be configured to generate one or more insights related to progress tracking on the construction project based on an analysis of the input data.

As described in greater detail below, the insights related to progress tracking on the construction project generated by the LLM may take various forms. As one example, the insights may take the form of updated status information related to one or more tasks on a schedule of the construction project, such as a particular scheduled task of interest, a set of scheduled tasks related to a particular section or location of the project (e.g., a particular floor, wing, or room, a section contracted out to a particular contractor), a set of scheduled tasks related to a particular trade, or a set of scheduled tasks for the project as a whole. As another example, the insights may take the form of updated status information related to a given type of material to be utilized on the construction project, which, as described in greater detail below, may be a delivery status of the given type of material and/or an installation status of the given type of material in connection with a particular scheduled task, a particular section or location of the project (e.g., a particular floor, wing, or room, a section contracted out to a particular contractor), or the project as a whole. In practice, such a delivery or installation status may be represented in terms of an amount of the given material that has been delivered or installed, which may be quantified in terms of a number of units of the material that has been delivered or installed, a length of the material that has been delivered or installed, etc. As yet another example, the insights may take the form of one or more proposed modifications to a schedule, such as the addition of a new scheduled task or the replacement of prior scheduled task with one or more new scheduled tasks. The insights related to progress tracking on the construction project that may be generated by the disclosed LLM may take various other forms as well.

Figure 2:
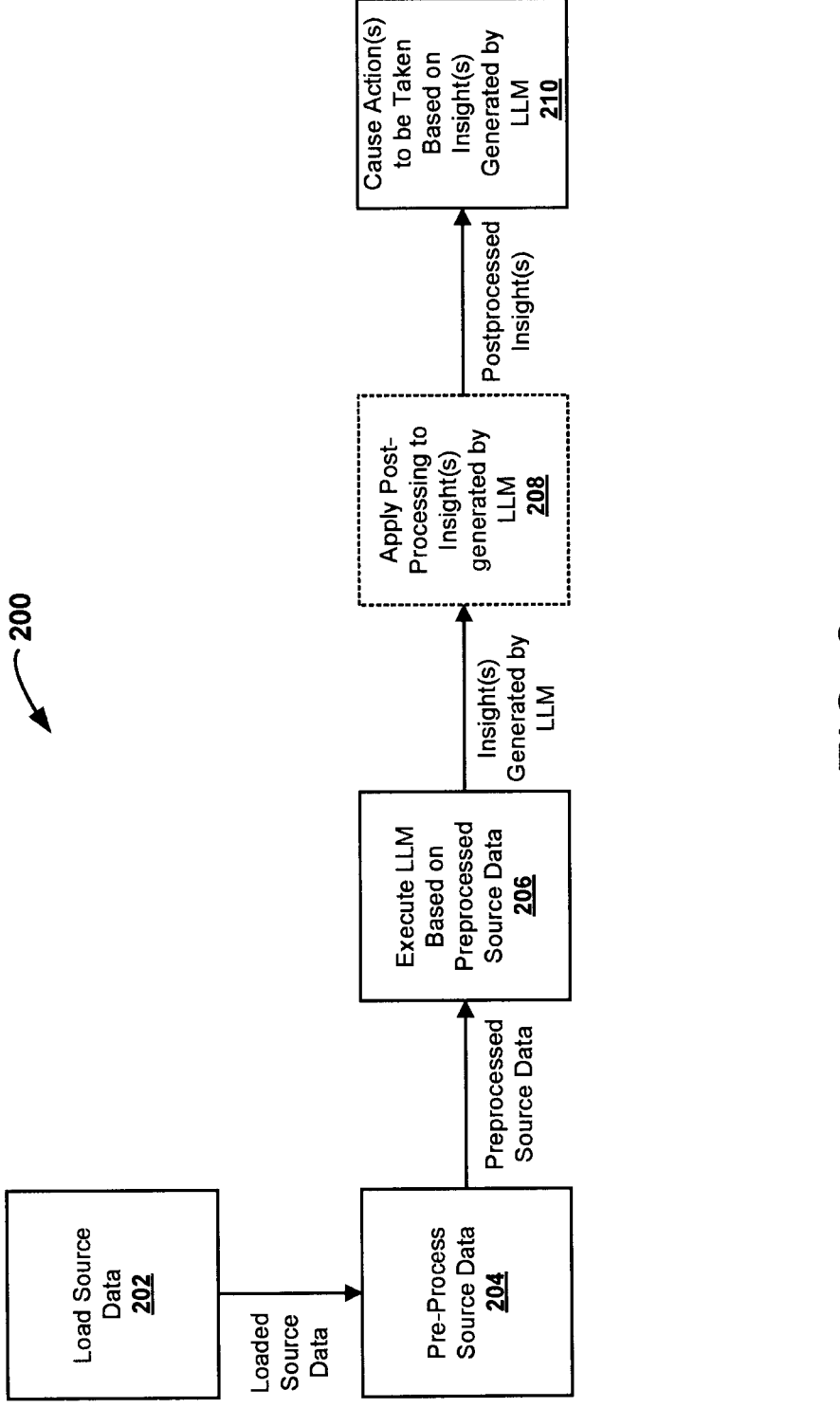
FIG. 2 depicts an example software pipeline to facilitate describing example operations that may be carried out in accordance with the disclosed software technology for project tracking.

Turning now to FIG. 2, an example software pipeline 200 is illustrated to facilitate describing example operations that may be carried out in accordance with the disclosed software technology for generating insights related to progress tracking on a construction project. In practice, the example software pipeline 200 of FIG. 2 may be encoded in the form of program instructions that are executable by one or more processors of a computing platform, and for purposes of illustration, the example software pipeline 200 of FIG. 2 is described as being installed on and carried out by the back-end computing platform 102 of FIG. 1, but it should be understood that the example software pipeline 200 of FIG. 2 may be installed on and carried out by any one or more computing platforms that are capable of performing the functionality of the example software pipeline 200. Further, it should be understood that the example software pipeline 200 of FIG. 2 is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

At block 202, the back-end computing platform 102 installed with the disclosed software pipeline may load source data that is to be utilized to generate insights related to progress tracking for a construction project, as described in greater detail below. This source data may take any of various forms.

As one possibility, the source data loaded by the back-end computing platform 102 installed with the disclosed software pipeline may take the form of a set of log entries for the construction project. These log entries for the construction project may be created and stored in various ways. For instance, as one possibility, individuals involved in the construction project may create and submit log entries during the course of their involvement on the construction project (e.g., on a daily basis, a weekly basis, etc.) in order to memorialize work they have performed on the construction project and/or observations they have made on the construction project, among other things. As another possibility, the back-end computing platform 102 may automatically generate certain types of log entries for the construction project based on other data that is stored for the construction project, such as by comparing snapshots of sensor data (e.g., image data, LiDAR data, etc.) taken at different times and then memorializing the differences in a log entry. In this respect, the back-end computing platform 102 may be configured to generate a textual description of the differences between the two snapshots of sensor data (e.g., using an LLM or the like) that is then memorialized in a log entry or the like. The log entries for the construction project may be created and stored in other ways as well.

In practice, there may be various types of log entries, and each of the various types of log entries may include various types of log data. Some types of log data may be included in each of the various types of log entries, and these types of log data may be referred to herein as "universal log data." Other types of log data may be included in some, but not all, of the various types of log entries. Still other types of log data may be unique, and each log data of these types of log data may only be included in a respective type of log entry.

Universal log data may include various types of log data. One type of universal log data may identify an individual who created a log entry for which the universal log data is created and stored. Another type of universal log data may identify the construction project associated with a log entry for which the universal log data is created and stored. Yet another type of universal log data may identify a log entry for which the universal log data is created and stored. Yet still another type of universal log data may identify the creation date of a log entry for which the universal log data is created and stored. Yet another type of universal log data may identify the creation time of a log entry for which the universal log data is created and stored. In practice, there may be various other types of universal log data.

Other types of log data, including types of log data that may be included in more than one type of log entry as well as types of log data that may be included in only log entries of a given type, will now be described within the context of the various types of log entries.

One type of log entry may be created and populated with log data that tracks various details regarding weather-related conditions at a jobsite of a given construction project. For instance, the log data of this type of log entry may track (i) any delays resulting from said weather conditions, (ii) the temperature at the jobsite, (iii) the wind direction at the jobsite, (iv) the rain projection at the jobsite, and (v) any comments related to the weather, among various other things. Further, in some implementations, some of this log data may be pulled from a weather software accessible to the back-end computing platform 102 installed with the disclosed software pipeline.

Another type of log entry may be created and populated with log data that tracks various details regarding the work done by people on site for a given construction project (e.g., details regarding the manpower for the given construction project). For instance, the log data of this type of log entry may track, for a given day, (i) who worked, (ii) who employs the workers, (iii) how many hours were worked, (iv) what work was performed, (v) what locations of the given construction project had work done, (vi) any comments, and (vii) cost codes for the work done, among other things.

Yet another type of log entry may be created and populated with log data that tracks any notes written for a given construction project. For instance, the log data of this type of log entry may track (i) comments regarding the given construction project, (ii) a status of the given construction project, and (iii) locations related to the comments and/or status, among other things.

Yet another type of log entry may be created and populated with log data that tracks various details regarding time entries for employees of the construction company utilizing the disclosed technology. For instance, the log data of this type of log entry may track (i) descriptions of time entries, including descriptions of work done, (ii) a number of hours worked, (iii) types of time entries, (iv) clock in and clock out times, (v) whether or not work done was billable, (vi) cost codes for time entries, and (vii) a location where work was done, among other things.

Yet another type of log entry may be created and populated with log data that tracks various details regarding equipment used for a given construction project. For instance, the log data of this type of log entry may track (i)

inspection times of the equipment, (ii) hours that the equipment was in use, (iii) hours that the equipment was idle, and (iv) a location where the equipment was used, among other things.

Yet another type of log entry may be created and populated with log data that tracks various details regarding visitors of a jobsite of a given construction project. For instance, the log data of the type of log entry may track (i) who visits the jobsite, (ii) when visits to the jobsite occur, (iii) details regarding the reason for and results of visits to the jobsite, among other things.

Yet another type of log entry may be created and populated with log data that tracks various details regarding inspections (e.g., third-party inspections) that may occur over the lifetime of a given construction project. For instance, the log data of this type of log entry may track, for a given inspection, (i) the type of inspection, (ii) who conducted the inspection, (iii) when the inspection occurred, and (iv) where the inspection occurred, among other things.

Yet another type of log entry may be created and populated with log data that tracks various details regarding shipments of materials for a given construction project. For instance, the log data for this type of log entry may track (i) what types of materials are to be shipped, (ii) the quantity of the materials, (iii) when the materials are delivered or scheduled to be delivered, and (iv) who is delivering the materials, among other things.

Yet another type of log entry may be created and populated with log data that tracks various details regarding safety violation reports for a given construction project. For instance, the log data for this type of log entry may track (i) a subject of a safety violation report describing the safety violation, (ii) a date of the safety violation, (iii) parties involved in a safety violation, (iv) planned recourses to be taken for a safety violation, among other things. Further, in some implementations, pictures may be stored in this type of log entry to show safety violations.

Yet another type of log entry may be created and populated with log data that tracks various details regarding phone calls relevant to a given construction project. For instance, the log data for this type of log entry may track (i) when calls are made, (ii) the parties of such calls, and (iii) any notes relevant to the calls, among other things.

Yet another type of log entry may be created and populated with log data that tracks various details regarding accident reports for a given construction project. For instance, the log data for this type of log entry may track (i) a subject of an accident report describing the accident, (ii) a date of the accident, and (iii) parties involved in the accident, among other things.

Yet another type of log entry may be created and populated with log data that tracks various details regarding the amount of materials that are used on a given day for a given construction project. For instance, the log data for this type of log entry may track (i) the types of materials used, (ii) cost codes of the materials, (iii) the quantity of materials used, and (iv) where the materials where used, among other things.

Yet another type of log entry may be created and populated with log data that tracks various details regarding material delivery and installation for a given construction project. For instance, the log data for this type of log entry may track (i) the types of materials delivered, (ii) the types of materials installed, (iii) the quantity of materials delivered, (iv) the quantity of materials installed, (v) where the materials are delivered, and (vi) where the materials are installed, among other things.

Yet another type of log entry may be created and populated with log data that tracks various details regarding dumpsters for a given construction project. For instance, the log data for this type of log entry may track (i) the quantity of dumpsters delivered or removed, (ii) parties involved in delivering or removing the dumpsters, (iii) where the dumpsters are delivered to or removed from, and (iv) when the dumpsters are delivered or removed, among other things.

Yet another type of log entry may be created and populated with log data that tracks various details regarding waste on a jobsite of a given construction project. For instance, the log data for this type of log entry may track (i) who disposed of waste, (ii) what waste was disposed, (iii) how the waste was disposed, and (iv) where the waste was disposed, among other things.

Yet another type of log entry may be created and populated with log data that tracks various details regarding scheduled work for a given construction project. In general, the scheduled work may refer to work scheduled to be performed by workers of a given trade that are hired for the given construction project. The log data for this type of log entry may track (i) who showed up at a given jobsite of the given construction project, (ii) what work was done, and (iii) the compensation rate for hired workers, among other things.

The example types of log entries described above are intended to be illustrative only, and in practice, there may be various other types of log entries. Further, the log data that is included for the log entries may take various other forms as well, including but not limited to the possibility that log entries may include images, videos, or other types of sensor data (and/or information derived therefrom).

As another possibility, the source data loaded by the back-end computing platform 102 installed with the disclosed software pipeline may take the form of reference documentation for the construction project that is utilized together with the log entries to generate the types of insights disclosed reference. Such reference documentation may take any of various forms.

In one implementation, the loaded reference documentation for the construction project may include one or more schedules for the construction project. In practice, a schedule may comprise schedule data defining one or more tasks that are included as part of the schedule. This schedule data may take various forms.

One type of schedule data may take the form of a task name for a task that is included in the schedule. Such a task name may take various forms. For instance, as one possibility, a task name may include a descriptive phrase for the task. Further, in some implementations, a task's name may include information that indicates a type or category of the task. A task name for a task included in a schedule may take other forms as well.

Another type of schedule data may take the form of an assignee for a task that is included in the schedule, which may identify an individual or party who is responsible for the task's completion.

Yet another type of schedule data may take the form of a status indication for a task that is included in the schedule. As one possibility, a task status indication may take the form of a status category of a set of status categories, and each status category of the set of status categories may describe a stage of completion of the task. Example status categories of the set of status categories may include "planned," "in progress," "ready for review," and "complete." However, these status categories are merely illustrative, and in practice the set of status categories may include other status categories. Further, the set of status categories may be predefined or defined by a user of the disclosed technology, e.g., to provide a more tailored breakdown of stages of completion for tasks. As another possibility, a task status indication may take the form of a completion percentage of the task (e.g., 33%, 66%, 100%).

Yet still another type of schedule data may take the form of a start date for a task that is included in the schedule. In practice, a task's start date may either be actual (i.e., when the task was started) or expected (i.e., when the task is/was expected to start).

Yet still another type of schedule data may take the form of an end date for a task that is included in the one or more schedules, which may similarly be actual or expected.

There may be various other types of schedule data as well.

Further, the schedule may include various sets of tasks. As one example, the schedule may include all scheduled tasks for the construction project, which is sometimes referred to as a "master schedule." As another example, the schedule may include less than all of the scheduled tasks for the construction project, and the tasks that are included in the schedule may be determined based on some set of criteria. Examples of such criteria may include (i) when tasks are scheduled to be completed, (ii) when tasks are created, (iii) who tasks are assigned to, (iv) what trade tasks are associated with, (v) what location tasks are associated with, and/or (vi) what types of materials tasks are associated with, among various other examples. One example of a schedule that includes less than all of the scheduled tasks for the construction project may take the form of a "lookahead schedule" for a given timeframe in the future.

Further yet, the tasks included in the schedule may either be arranged in a flat list or may be arranged in a hierarchical structure where certain tasks have parent/child relationships with one another. As a simple example, a given task named "piping" may have children tasks named "determine piping layout," "order materials for piping," and "install piping." Various other examples may also exist.

The one or more schedules for the construction project may take various other forms as well.

In another implementation, the loaded reference documentation for the construction project may include any other type of documentation that provides reference information regarding the tasks for the project and/or the materials for the project, examples of which may include specifications, drawings, BIM files, or like.

The source data loaded by the back-end computing platform 102 installed with the disclosed software pipeline may take other forms as well. For example, the source data may take the form of other types of data for the construction project that may contain information about the progress of the project, such as meeting notes, chat messages, emails, etc.

Further, the back-end computing platform 102 installed with the disclosed software pipeline may load the source data in various manners. As one possibility, the back-end computing platform 102 installed with the disclosed software pipeline may load the source data by retrieving the source data from data storage of the back-end computing platform 102. As another possibility, the back-end computing platform 102 installed with the disclosed software pipeline may load the source data by obtaining the source data from a data source that is external to the back-end computing platform 102. The back-end computing platform 102 installed with the disclosed software pipeline may load the source data in various other ways as well.

Further yet, in operation, the back-end computing platform 102 installed with the disclosed software pipeline may load the source data at any of various times. For instance, the back-end computing platform 102 may be configured to load source data according to a periodic frequency and/or in response to certain triggering events (e.g., receiving a request from a user, detecting the availability of new source data, etc.). Further, the back-end computing platform's logic for determining which particular source data to load during each iteration of the disclosed software pipeline could be hardcoded into the back-end computing platform 102 installed with the disclosed software pipeline, configured based on user input received via a user interface that is provided by the back-end computing platform 102 installed with the disclosed software pipeline and/or other configuration data that is defined by the back-end computing platform 102 installed with the disclosed software pipeline, or some combination thereof, among other possibilities.

At block 204, the back-end computing platform 102 installed with the disclosed software pipeline may carry out certain preprocessing operations on the loaded source data in order to prepare such data for use by the LLM described below. These preprocessing operations could take any of various forms, and may vary depending on the type of loaded source data. For instance, in line with the previous discussion, the loaded source data may include a set of log entries and one or more schedules, and the back-end computing platform 102 installed with the disclosed software pipeline may apply different preprocessing operations to these two different types of source data. For simplicity, loaded source data taking the form of a set of log entries may be referred to herein as "loaded log data," and loaded source data taking the form of one or more schedules may be referred to herein as "loaded schedule data."

As one possibility, the preprocessing operations carried out by the back-end computing platform 102 installed with the disclosed software pipeline for the loaded log data may involve determining which types of log entries and/or which types of log data should be utilized as input to the LLM, which may be referred to as "feature selection." In practice, this function may depend on the available log data and the types of insights to be predicted, among other possible factors. For instance, the back-end computing platform 102 installed with the disclosed software pipeline may, based on the loaded log entries and possibly the type of insights to be generated by the LLM, exclude certain types of log data from the loaded log entries (e.g., log data for cost codes) and include other types of log data from the loaded log entries (e.g., log data for locations, trades, notes, etc.). As another example, the back-end computing platform 102 installed with the disclosed software pipeline may, based on the loaded log entries and possibly the type of insights to be generated by the LLM, exclude certain types of log entries (e.g., log entries with log data that tracks manpower) and include other types of log entries (e.g., log entries with log data that tracks weather). Other examples are possible as well.

The types of log entries and/or log data that are selected for input to the LLM may be encoded into a schema that defines one or more data structures for encoding the loaded log data in a format that can be passed as input to the LLM. Such a schema may take any of various forms. As one example, the schema may define a single data structure for encoding the loaded log data, which may include a consolidated set of data fields that are applicable to the different types of log entries loaded by the disclosed software pipeline. As another example, the schema may define multiple data structures for encoding the loaded log data that are each specific to a given type of log entry (e.g., a first data structure for a first type of log entry, a second data structure for a second type of log entry, etc.) along with an index or lookup table of the data structures.

As another possibility, the preprocessing operations carried out by the back-end computing platform 102 installed with the disclosed software pipeline for the loaded log data may involve mapping the loaded log data to the schema for the LLM. This mapping functionality may include any of various operations, examples of which may include interpreting and matching the data fields of the loaded log data with the data fields of the schema, identifying and extracting keywords and/or features from the loaded log data, transforming the contents of the loaded log data into a form that is suitable for input to the LLM (e.g., by generating a textual description of the differences between two photos), deriving feature values based on the contents of the loaded log data, correcting spelling and/or grammatical errors, unification, non-ascii character removal, stop word removal, lemmatization, sentiment analysis, and data type conversion, among various other possibilities.

The preprocessing operations may take any of various other forms as well.

As another possibility, the preprocessing operations carried out by the back-end computing platform 102 installed with the disclosed software pipeline for the loaded schedule data may involve mapping the schedule data to a schema that defines one or more data structures for encoding the schedule data in a format that can be passed as input to the LLM. For instance, the loaded schedule data may not adhere to recommended practices for creating schedules files, among other things. And as a result, the loaded schedule data may not be formatted correctly for use by the LLM (e.g., the loaded schedule data may not be formatted correctly for linkage with the loaded log data.) To resolve these and other issues, the loaded schedule data may be mapped to a schema that defines a particular set of schedule data fields that are to be utilized by the LLM.

In practice, this functionality of mapping the loaded schedule data to a schema for input into the LLM may include any of various operations, including but not limited to any of the operations discussed above in connection with the loaded log data.

Additionally, in some implementations, an LLM may be utilized for preprocessing the loaded schedule data. As one possibility, the LLM may leverage its broad understanding of construction schedules (e.g., based on pretraining of the LLM, as described in greater detail below) to reformat and/or transform the loaded schedule data into a suitable format for input to the disclosed LLM for progress tracking, and/or expand the loaded schedule into lower level activities by location hierarchy or cost codes. As another possibility, the LLM may utilize project details (e.g., from the loaded source data) for the construction project as a basis for reformatting and/or transforming the loaded schedule data into a suitable format for input to the disclosed LLM for progress tracking. In this way, the processing of the loaded schedule data may create more effective schedules that will enhance progress tracking (e.g., by reformatting the loaded schedule data for linkage with the loaded log data).

At block 206, the back-end computing platform 102 installed with the disclosed software pipeline may provide a set of input data to an LLM and thereby cause the LLM to output one or more insights related to progress tracking based on the input data. For instance, if the LLM is hosted locally on the back-end computing platform 102 itself, then this function may involve inputting the input data into the locally-hosted LLM and then executing the locally-hosted LLM in order to cause the LLM to output one or more insights related to progress tracking based on the input data. Alternatively, if the LLM is hosted remotely on an external computing platform, then this function may involve transmitting the set of input data to the external computing platform via a network-based communication path along with a request to execute the remotely-hosted LLM based on the set of input data (e.g., an API request message comprising a prompt), which may cause the external computing platform to input the set of input data into the remotely-hosted LLM and then execute the remotely-hosted LLM in order to cause the LLM to output one or more insights related to progress tracking based on the input data that are then returned to the back-end computing platform 102 via the network-based communication path as a response to the back-end computing platform request (e.g., an API response). The function of causing the LLM to be executed based on the input data may take other forms as well.

The LLM may take any of various forms, and some examples may include a GPT type of LLM, a BERT type of LLM, a T5 type of LLM, and a PEGASUS type of LLM, among various others. Further, in practice, the LLM may either be trained by the back-end computing platform 102 installed with the disclosed software pipeline, or may be pre-trained by some other computer platform that is external to the back-end computing platform 102 prior to access by the back-end computing platform 102 (either with or without fine-tuning by the back-end computing platform 102).

In line with the discussion above, the LLM may generally function to (i) receive input data and (ii) generate one or more insights based on an analysis of the received input data. The input data of the LLM may take any of various forms.

One type of input data of the LLM may take the form of the loaded source data, such as the loaded log data (e.g., log entries created by users and/or by the back-end computing platform 102) and the loaded reference documentation (e.g., the loaded schedule data), at least some of which may be preprocessed in the manner described above. Another type of input data of the LLM may take the form of a prompt for the LLM, such as a request for one or more insights related to progress tracking on the construction project, which may be generated by the back-end computing platform 102 (e.g., based on a request that is received from the client device 104). The prompt may include, among other things, (i) an identification of the type of insight(s) requested, (ii) an identification of what types of loaded source data the one or more insights should be based on, and/or (iii) a timeline from which to base the one or more insights. Further, the prompt may be refined so as to improve the accuracy of the insights generated by the LLM. For instance, the prompt may be refined to further defined the request for one or more insights related to progress tracking on the construction project, such as by (i) applying chunking techniques for lengthy prompts, (ii) defining a particular format of the insights generated by the LLM (e.g., by requesting that results be provided as json or dictionary objects), and (iii) defining an organization of loaded source data to ensure that the LLM analyzes the loaded source data correctly (e.g., by designating a nested structure for schedule data to reflect the hierarchical organization of the schedule data), among other possibilities. Examples of prompts that may be input to the LLM are described in greater detail below with respect to FIGS. 3, 5, and 7. The input data of the LLM may take various other forms as well.

The types of insights that may be generated by the LLM, as well as the analysis of the received input data performed by the LLM to generate said insights, may take any of various forms. One type of insight that the LLM may generate based on the received input data may take the form of status information related to one or more tasks included in a schedule of the construction project. In this respect, the one or more tasks could comprise all scheduled tasks, a particular category of tasks (e.g., tasks related to a particular section/location of the project or a particular trade), or one specific task of interest, among other possibilities. Further, the status information related to the one or more tasks generated by the LLM may take various forms.

As one possibility, the LLM may be configured to generate status information related to the one or more tasks that takes the form of one or more textual summaries of the one or more tasks. At a high level, the LLM may generate a textual summary of one or more tasks included in a schedule of the construction project by identifying loaded log data that appear to relate to the one or more of the tasks (e.g., by searching for references to task names or other attributes of the one or more tasks in certain data fields of the loaded log data) and then generating the textual summary of the one or more tasks based on an analysis the identified log entries. Further details regarding this functionality of generating textual summaries of scheduled tasks are described below with respect to FIGS. 3 and 4A-4C.

As another possibility, the LLM may be configured to generate status information related to the one or more tasks that takes the form of one or more status indications for the one or more tasks. The status indication for a task could be represented in terms of a status category, a completion percentage, or an amount of work that has gone towards completing the task (e.g., an amount of material that been installed, an amount of man hours that have put into completing the task, etc.). At a high level, the LLM may generate a status indication of a task included in a schedule of the construction project by identifying loaded log data that appear to relate to the task (e.g., by searching for references to task names or other attributes of the one or more tasks in certain data fields of the loaded log data) and then generating the status indication of the task based on an analysis the identified log entries-which may then be compared against the status indication that is currently included in the schedule data for the construction project. Further details regarding this functionality of generating status indications of scheduled tasks are described below with respect to FIGS. 5 and 6.

As yet another possibility, the LLM may be configured to generate status information related to the one or more tasks that takes the form of start dates and/or end dates of one or more tasks. At a high level, the LLM may generate a start date and/or end date of a task included in a schedule of the construction project by identifying loaded log data that appear to relate to the task (e.g., by searching for references to task names or other attributes of the one or more tasks in certain data fields of the loaded log data) and then generating a start date and/or end date of the task based on an analysis the identified log entries-which may then be compared against the start date and/or end date that is currently included in the schedule data for the construction project.

Further details regarding this functionality of generating start and/or end dates of scheduled tasks are described below with respect to FIGS. 5 and 6.

The LLM may be configured to generate status information related to the one or more tasks that takes various other forms as well.

Another type of insight that the LLM may generate based on the received input data may take the form of status information related to a given type of material to be utilized on a construction project. The given type of material may take various forms. As one possibility, the given type of material may take the form of a particular material (e.g., copper piping) to be utilized on a construction project. As another possibility, the given type of material may take the form of materials needed for a given task of the construction project (e.g., materials required for a task named "install drywall"). As yet another possibility, the given type of material may take the form of materials associated with a given trade or cost code (e.g., materials associated with electrical tasks). Various other possibilities may also exist. Further, status information related to the given type of material that is generated by the LLM may take various forms.

As one possibility, the LLM may be configured to generate status information related to the given type of material that takes the form of the delivery status of the given type of material in connection with a particular scheduled task, a particular section or location of the project (e.g., a particular floor, wing, or room, a section contracted out to a particular contractor), or the project as a whole-such as an indication of (i) an amount of the given type of material that has been delivered, which may be quantified in terms of a number of units of the given type of material that has been delivered (e.g., number of doors delivered), a length of the material that has been delivered (e.g., the number of linear feet of piping delivered), or the like, and/or (ii) a timeline of delivery of the given type of material.

As another possibility, the LLM may be configured to generate status information related to the given type of material that takes the form of the installation status the given type of material in connection with a particular scheduled task, a particular section or location of the project (e.g., a particular floor, wing, or room, a section contracted out to a particular contractor), or the project as a whole-such as an indication of (i) an amount of the given type of material that has been installed, which may be quantified in terms of a number of units of the given type of material that has been installed (e.g., number of doors installed), a length of the material that has been installed (e.g., the number of linear feet of piping installed), or the like, and/or (ii) a timeline of installation of the given type of material.

The status information related to the given type of material that is generated by the LLM may take other forms as well.

Further, at a high level, the LLM may generate status information related to the given type of material by (i) identifying the given type of material from loaded reference documentation (e.g., one or more schedules, specifications, drawings, etc.), (ii) identifying loaded log data that appear to relate to the status of the given type of material (e.g., by searching for references to given type of material in certain data fields of the loaded log data), and then (iii) generating the status information related to the given type of material based on an analysis the identified log entries. Further details regarding this functionality of generating a predicted status of a given type of material are described below with respect to FIGS. 7 and 8.

Yet another type of insight that the LLM may generate based on the received input data may be one or more proposed modifications to tasks on a schedule. The proposed modifications may take any of various forms. One proposed modification may be to add a new task to the schedule. Another proposed modification to break down an existing task on the schedule into multiple tasks (e.g., by adding one or more subtasks to the existing task or by adding one or more new tasks to the schedule that are not subtasks of the existing task) or otherwise replace an existing task with one or more new tasks. The proposed modifications may take various other forms as well. In practice, the LLM may generate the one or more proposed modifications by identifying loaded log data that appear to relate to tasks on the schedule (e.g., by searching for references to task names or other attributes of the one or more tasks in certain data fields of the loaded log data) and then generating a proposed modification based on an analysis of the identified log entries. This analysis may involve an analysis of locations mentioned in the loaded log data, rework done, start dates, end dates, delays in a task's completion, and change orders, among various other details included in the loaded log data that appear to relate to the tasks on the schedule.

As an example, the LLM may determine, based on an analysis of log entries that indicate that rework was done on a drywall installation, that a reinspection is needed for the rework. And based on this determination, the LLM may propose a new task for the reinspection, which proposal may include proposed schedule data for the new task (e.g., a proposed assignee, a proposed start date, a proposed end date, etc.). Various other examples may also exist.

In practice, the LLM may generate various other insights as well. Further, for any tasks and/or types of material that are not discussed in the loaded log data, the LLM may include an indication to that effect in the insights the LLM generates. For instance, if a given task is not mentioned in the loaded log data, then a given summary of the given task generated by the LLM may state that the given task "was not mentioned during this period." Various other examples may also exist.

At block 208, the back-end computing platform 102 installed with the disclosed software pipeline may optionally apply one or more post-processing operations to one or more insights generated by the LLM in order to prepare the one or more insights for downstream use. For instance, one or more of the insights generated by the LLM may not be in a format that is readily usable by a user of the back-end computing platform 102 installed with the disclosed software pipeline (e.g., the insights may be in a raw text format, etc.). In such instances, the back-end computing platform 102 installed with the disclosed software pipeline may apply the one or more post-processing operations to transform the one or more insights into a format that is ready for use. Some example post-processing operations may include: decoding, sentence segmentation, formatting, language correction, entity recognition, filtering, and visualization operations, among various other possibilities. As an example, status information related to one or more tasks included in a schedule of the construction project generated by the LLM may include a set of task items and a dictionary of status information, which may not be in a format that is readily usable by a user of the back-end computing platform 102 installed with the disclosed software pipeline. To resolve this, the back-end computing platform 102 installed with the disclosed software pipeline may (i) receive the set of task items and dictionary of status information as inputs, (ii) apply one or more post-processing operations to repackage the outputs of the LLM into a different form (e.g., one that is usable by a user of the back-end computing platform 102), and (iii) return the repackaged outputs of the LLM, which may take the form of a status indication for each task in the set of task items. Various other examples may also exist.

Further, the post-processing operations that are applied may vary depending on the type of insight generated by the LLM.

Further, some insights generated by the LLM may already be in a format that is readily usable by a user of the back-end computing platform 102 installed with the disclosed software pipeline, and so the back-end computing platform 102 installed with the disclosed software pipeline may not apply any post-processing operations to such insights.

At block 210, the back-end computing platform 102 installed with the disclosed software pipeline may cause one or more actions to be taken based on one or more insights generated by the LLM.

One such action may comprise presenting one or more insights to one or more users of the back-end computing platform 102. Further details regarding causing insights to be presented to one or more users of the back-end computing platform 102 are described below, with respect to FIGS. 3-8.

Another such action may comprise storing one or more insights generated by the LLM at the back-end computing platform 102 for future access. In some implementations, storing the one or more insights may comprise storing new data comprising the one or more insights at the back-end computing platform 102. Additionally or alternatively, storing the one or more insights may comprise updating existing data stored at the back-end computing platform 102, for example, based on the one or more insights.

Yet another such action may comprise updating one or more schedules of a construction project based on the one or more insights. As one example, this may include (i) changing the status indications of one or more tasks on a construction project schedule based on determining that the status of the one or more tasks has changed (e.g., updating the status category of a given task from "in review" to "completed,") (ii) changing the start/end dates of one or more tasks on a construction project schedule, e.g., based on determining that the start/end dates have changed, and/or (iii) creating new tasks or removing tasks from a schedule, e.g., based on insights comprising one or more proposed modifications to the schedule. Various other examples may also exist.

Yet still another action may comprise providing documentation to explain how one or more insights were generated by the LLM. For instance, the back-end computing platform 102 installed with the disclosed software pipeline may provide documentation showing the loaded source data that was analyzed in generating the one or more insights, as well as details of the analysis. Such documentation may be useful for verifying the accuracy and completeness of insights generated by the LLM, as well as for informing users tasked with prompt generation for the LLM how to adjust prompts provided to the LLM to improve the accuracy and completeness of said insights.

In practice, the back-end computing platform 102 installed with the disclosed software pipeline may cause various other actions to be taken based on one or more insights generated by the LLM.

Moreover, the functions of the disclosed software pipeline may be carried out in response to various trigger events. As one possibility, the back-end computing platform 102 may carry out functions of the disclosed software pipeline in response to receiving a request for one or more insights via the client device 104.

As another possibility, the back-end computing platform 102 may carry out functions of the disclosed software pipeline according to a periodic frequency. As one example, the back-end computing platform 102 may be configured to load source data at a given periodic frequency, as previously described. As another example, the back-end computing platform 102 may be configured to execute the LLM at a given periodic frequency to determine insights regarding the statuses of scheduled tasks on a construction project schedule, which may then be used to update the schedule data for the construction project as appropriate. As another example, the back-end computing platform 102 may be configured to execute the LLM at a given periodic frequency to determine insights comprising proposed modifications to a construction project schedule, which may then be used to modify the construction project schedule by adding new tasks, removing tasks, etc., as previously described.

In line with the previous discussion, the back-end computing platform 102 may execute the LLM in various ways, depending on where the LLM is stored. In implementations where the LLM is stored locally on the back-end computing platform 102, the back-end computing platform 102 may execute the LLM locally. And in implementations where the LLM is hosted at an external computing platform, the back-end computing platform 102 may execute the LLM via transmitting a request to the external computing platform hosting the LLM to execute the LLM.

Further, the back-end computing platform 102 may be configured to perform any of the functions of the disclosed software pipeline at certain periodic frequencies as well. Various other trigger events may also exist.

Further, although the functions of the disclosed software pipeline are described with respect to progress tracking for a given construction project, in some implementations, the functions of the disclosed software pipeline may be used to track progress across multiple construction projects.

Figure 3:
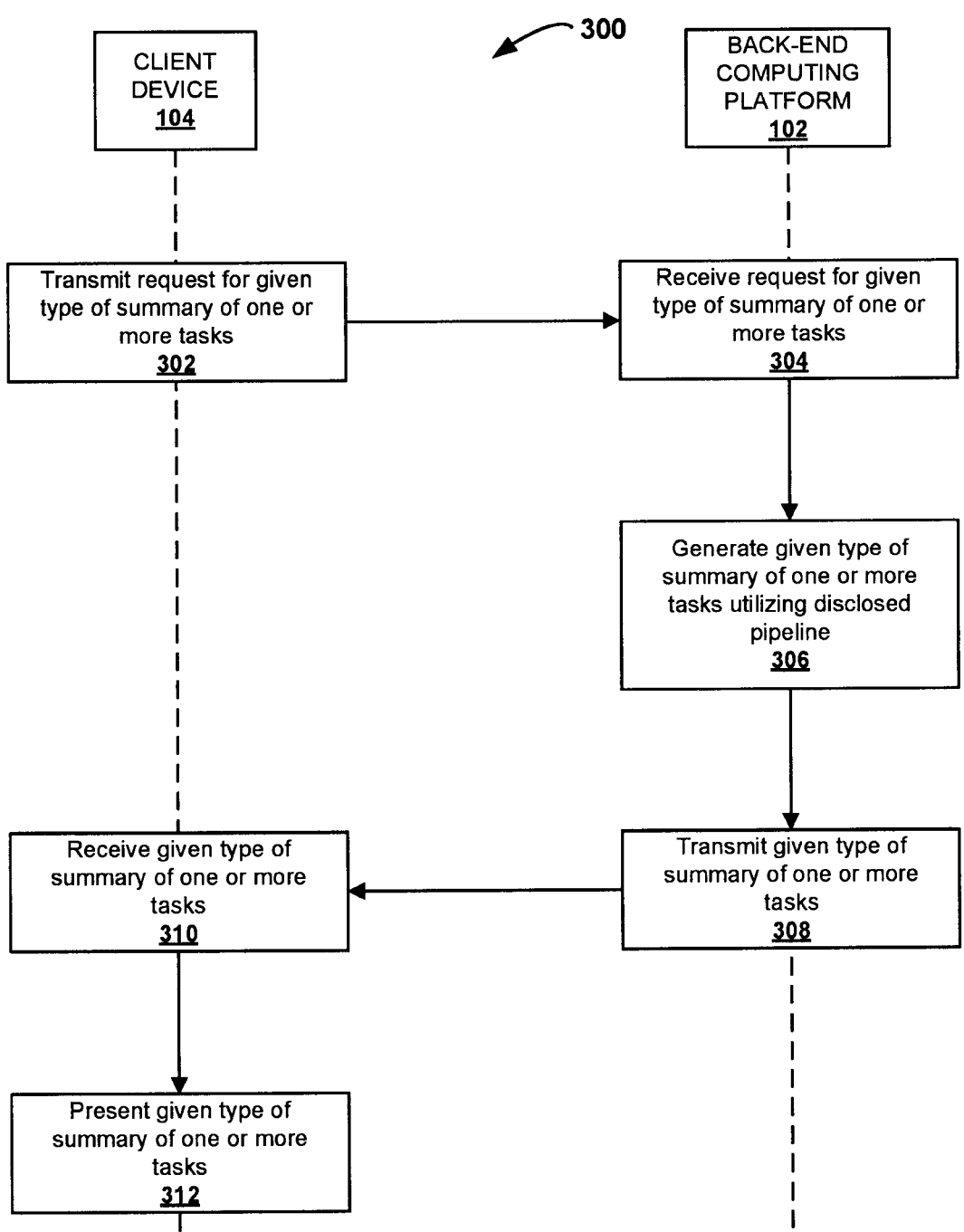
FIG. 3 depicts a flow diagram of an example process that may be carried out in accordance with the disclosed software pipeline for generating insights related to progress tracking.

Turning now to FIG. 3, a flow diagram 300 is depicted showing an example process that may be carried out in accordance with the disclosed software pipeline for generating insights related to progress tracking. As shown, certain functions of the flow diagram 300 are performed by the client device 104, whereas other functions of the flow diagram 300 are performed by the back-end computing platform 102. However, it should be understood that functions of the flow diagram 300 may be performed by various other computing devices. Further, the flow diagram 300 is at least partially intended to further expound on various of the functions previously described with respect to the disclosed software pipeline, e.g., as in the description of FIG. 2, as well as to show an illustrative example of how said functions may be performed within the context of a user of the client device 104 interacting with the disclosed software pipeline.

Starting at block 302, the client device 104 may transmit a request for a given type of summary of one or more tasks included on a schedule of a construction project. In line with the previous discussion, the request may be used by the back-end platform 102 to define the prompt that is provided to the LLM as input data, and may include various types of information to enable the back-end computing platform 102 installed with the disclosed software pipeline to provide the given summary.

One type of information that may be included in the request may be information identifying what type of summary should be provided for the one or more tasks. As one example, the request may include information describing that a single summary should be provided that collectively summarizes the one or more tasks. As another example, the request may include information describing that a respective summary should be provided for each of the one or more tasks. Various other examples may also exist.

Another type of information that may be included in the request may be information identifying the one or more tasks for which the given type of summary is to be provided. For instance, as one possibility, the request may include information identifying a single task for which the given type of summary is to be provided. As another possibility, the request may include information identifying a group of tasks for which the given type of summary is to be provided. For example, the request may include information identifying that the given type of summary should be provided for tasks that relate to a common trade (e.g., electrical, plumbing, etc.). As another example, the request may include information identifying that the given type of summary should be provided for tasks that relate to a common location of the construction project (e.g., tasks related to a given floor, room, etc. that is to be constructed). As yet another example, the request may include information identifying that the given type of summary should be provided for tasks related to a common subcontractor hired for the construction project. As yet still another example, the request may include information identifying that the given type of summary should be provided for tasks that relate to a common timeframe relevant to the construction project (e.g., tasks that started within the past month, tasks that are due within the next two weeks, etc.). Various other examples may also exist, and in some implementations the request may include information that identifies that the given type of summary should be provided for tasks that relate to more than one common aspect of the construction project (e.g., tasks that relate to both a common trade as well as a common location of the construction project).

Yet another type of information that may be included in the request may be information identifying a given timeframe from which to base the given type of summary. For example, the request may include information identifying that the given type of summary should be based on source data that was created within a given timeframe, rather than on other source data corresponding to the one or more tasks. For instance, the given timeframe may be a period of days, weeks, months, etc.

The request may include various other types of information as well.

In practice, the client device 104 may transmit the request based on receiving user input on the client device 104 that defines the request. For instance, a user of the client device 104 may interact with a graphical user interface (GUI) provided by client-side software running on the client device 104 (e.g., by typing the request into a textbox) to input the request and/or may provide audio input to the client device 104, among other possibilities. Further, the client device 104 may transmit the request to the back-end computing platform 102 installed with the disclosed software pipeline via the communication path 106.

At block 304, the back-end computing platform 102 installed with the disclosed software pipeline may receive the request for the given type of summary of the one or more tasks from the client device 104, e.g., via the communication path 106.

At block 306, the back-end computing platform 102 may generate the given type of summary of the one or more tasks utilizing the disclosed software pipeline. In line with the previous discussion, this may involve performing operations of the disclosed software pipeline, as described above with respect to FIG. 2.

In some implementations, performing operations of block 306 may involve loading source data (block 202 of FIG. 2) and preprocessing the loaded source data (block 204 of FIG. 2) in response to receiving the request. However, in other implementations, the back-end computing platform 102 installed with the disclosed software pipeline may perform operations of blocks 202 and 204 prior to performing the operations of block 306. For instance, the back-end computing platform 102 installed with the disclosed software pipeline may load source data and preprocess the loaded source data according to a periodic frequency, as previously described.

In any case, performing operations of block 306 may further involve generating, via the LLM, the given type of summary of the one or more tasks utilizing the disclosed software pipeline, as previously described with respect to block 206.

In line with the previous discussion, the back-end computing platform 102 installed with the disclosed software pipeline may then perform any post-processing operations necessary to convert the given summary of the one or more tasks into a format that is usable by the client device 104.

Although one or more of the operations of block 306 have been described as being at least partially based on the request received at block 304, in at least one implementations, the back-end computing platform 102 installed with the disclosed software technology may be configured to perform operations of block 306 without receiving a request to generate a given type of summary of one or more tasks. For instance, the back-end computing platform 102 installed with the disclosed software pipeline may be configured to generate summaries automatically, e.g., based on a periodic frequency.

At block 308, the back-end computing platform 102 installed with the disclosed software pipeline may transmit the given summary of the one or more tasks to the client device 104, for instance, via the communication path 106.

At block 310, the client device 104 may receive the given summary of the one or more tasks from the back-end computing platform 102 installed with the disclosed software pipeline, for instance, via the communication path 106.

At block 312, the client device 104 may present the given summary of the one or more tasks, for instance, via the GUI of the client-side software running on the client device 104.

FIG. 4A shows one possible example of a set of textual summaries 400 that may be generated by the disclosed software pipeline. As shown, the example summaries 400 cover eight tasks over a two-week period that extends from March 1$^{st}$ to March 14$^{th}$. As an example, the back-end computing platform 102 installed with the disclosed software pipeline may generate the example summaries 400 in response to a request for textual summaries of the illustrated tasks from the two-week period that extends from March 1$^{st}$ to March 14$^{th}$.

FIG. 4B shows another possible example of a set of textual summaries 402 that may be generated by the disclosed software pipeline. As shown, the example summaries 402 cover eight tasks that are associated with (i) a given location (e.g., the first floor) of a construction project as well as (ii) a specific timeframe. As an example, the back-end computing platform 102 installed with the disclosed software pipeline may generate the example summaries 402 in response to a request for textual summaries of tasks associated with the first floor of the construction project for the specific timeframe.

FIG. 4C shows another possible example of a set of textual summaries 404 that may be generated by the disclosed software pipeline. As shown, the example summaries 404 cover five tasks that are associated with (i) electrical work of a construction project as well as (ii) a specific timeframe. As an example, the back-end computing platform 102 installed with the disclosed software pipeline may generate the example summary 404 in response to a request for textual summaries of tasks associated with the electrical work of the construction project for the specific timeframe.

Figure 5:
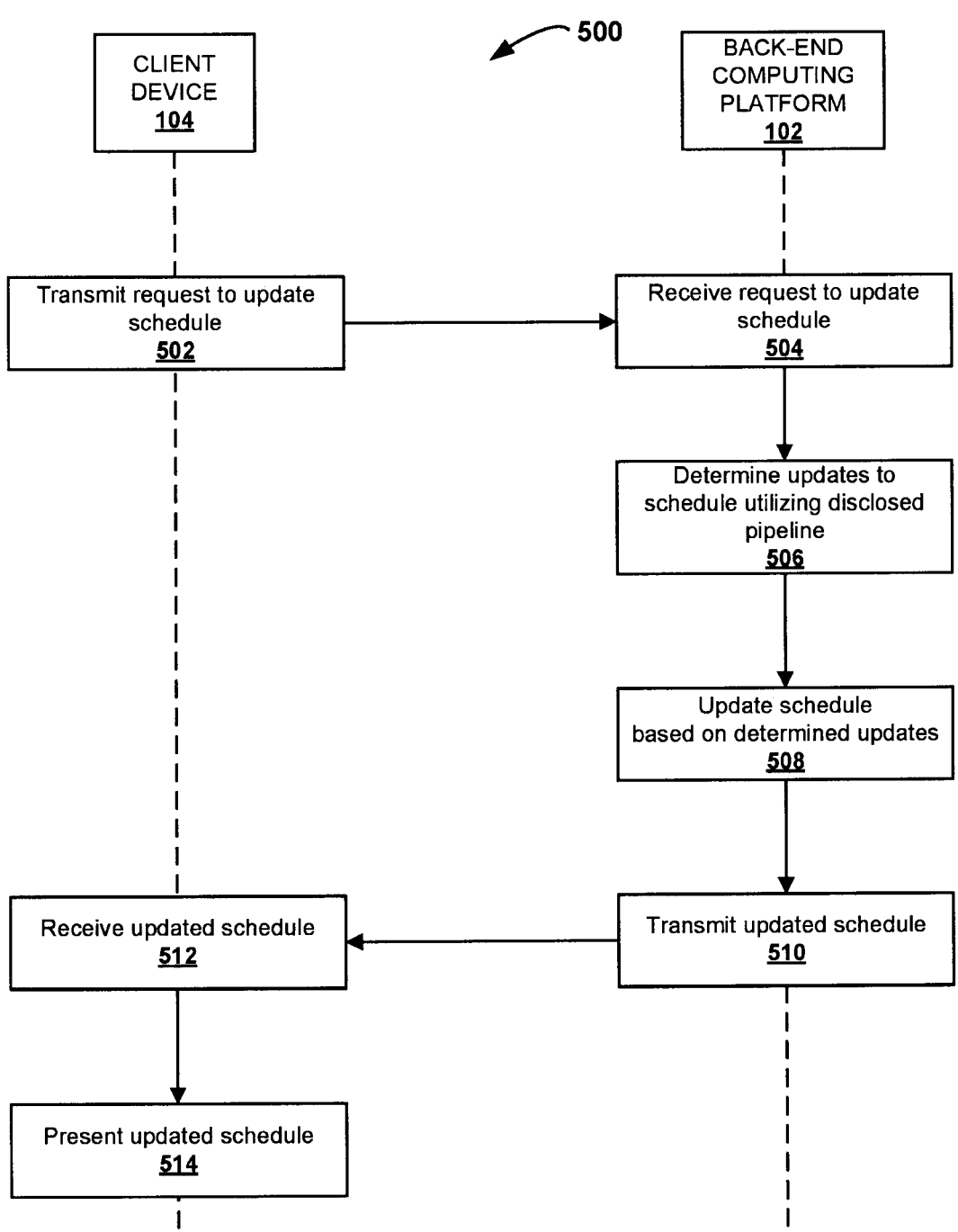
FIG. 5 depicts a flow diagram of an example process that may be carried out in accordance with the disclosed software technology for generating insights related to progress tracking.

Turning now to FIG. 5, a flow diagram 500 is depicted showing an example process that may be carried out in accordance with the disclosed software pipeline for generating insights related to progress tracking. As shown, certain functions of the flow diagram 300 are performed by the client device 104, whereas other functions of the flow diagram 300 are performed by the back-end computing platform 102. However, it should be understood that functions of the flow diagram 300 may be performed by various other computing devices. Further, the flow diagram 300 is at least partially intended to further expound on various of the functions previously described with respect to the disclosed software pipeline, e.g., as in the description of FIG. 2, as well as to show an illustrative example of how said functions may be performed within the context of a user of the client device 104 interacting with the disclosed software pipeline.

Starting at block 502, the client device 104 may transmit a request for the back-end computing platform 102 to update a schedule of a construction project. In line with the previous discussion, the request may be used by the back-end platform 102 to define the prompt that is provided to the LLM as input data, and may include various types of information to enable the back-end computing platform 102 installed with the disclosed software pipeline to update the schedule.

One type of information that may be included in the request may be information identifying the schedule that is to be updated. Another type of information that may be included in the request may be information identifying one or more tasks of the schedule that are to be updated. However, in some implementations, the request may not include any such information, and the back-end computing platform 102 installed with the disclosed software pipeline may instead determine which tasks of the schedule are due for an update, and update those tasks. Yet another type of information that may be included in the request may be information identifying what attributes of the tasks of the schedule are to be updated. As one example, the request may include information identifying that the status indications of the tasks of the schedule are to be updated. As another example, the request may include information identifying that the start dates and/or the end dates of the tasks of the schedule are to be updated. Various other examples may also exist.

Yet another type of information that may be included in the request may be information identifying a periodic frequency, which the back-end computing platform 102 installed with the disclosed software pipeline may use in automatically checking loaded source data to determine whether to update the schedule.

The request may include various other types of information as well.

In practice, the client device 104 may transmit the request based on receiving user input on the client device 104 that defines the request. For instance, a user of the client device 104 may interact with a GUI provided by client-side software running on the client device 104 (e.g., by typing the request into a textbox) to input the request and/or may provide audio input to the client device 104, among other possibilities. Further, the client device 104 may transmit the request to the back-end computing platform 102 installed with the disclosed software pipeline via the communication path 106.

At block 504, the back-end computing platform 102 installed with the disclosed software pipeline may receive the request to update the schedule from the client device 104, e.g., via the communication path 106.

At block 506, the back-end computing platform 102 may determine one or more updates to the schedule utilizing the disclosed software pipeline. In line with the previous discussion, this may involve performing operations of the disclosed software pipeline, as described above with respect to FIG. 2.

In some implementations, performing operations of block 506 may involve loading source data (block 202 of FIG. 2) and preprocessing the loaded source data (block 204 of FIG. 2) in response to receiving the request at block 504. However, in other implementations, the back-end computing platform 102 installed with the disclosed software pipeline may perform operations of blocks 202 and 204 prior to performing the operations of block 506. For instance, the back-end computing platform 102 installed with the disclosed software pipeline may load source data and preprocess the loaded source data according to a periodic frequency, as previously described.

In any case, performing operations of block 506 may further involve determining, via the LLM, one or more insights comprising one or more updates to the schedule, utilizing the disclosed software pipeline, as previously described with respect to block 206.

In line with the previous discussion, the back-end computing platform 102 installed with the disclosed software pipeline may then perform any post-processing operations necessary to generate one or more insights comprising one or more updates to the schedule.

Although one or more of the operations of block 506 have been described as being at least partially based on the request received at block 504, in at least one implementation, the back-end computing platform 102 installed with the disclosed software technology may be configured to perform operations of block 506 without receiving a request to update the schedule. For instance, the back-end computing platform 102 installed with the disclosed software pipeline may be configured to determine updates to construction project schedules automatically, e.g., based on a periodic frequency.

At block 508, the back-end computing platform 102 installed with the disclosed software pipeline may update the schedule based on the determined updates to the one or more tasks. As one example, the LLM may generate an insight comprising an indication that a first task has progressed from a first status category (e.g., initiated) to a second status category (e.g., in progress) and that a second task has progressed from a third status category (e.g., in review) to a fourth status category (e.g., completed). Based on these determined updates, the back-end computing platform 102 installed with the disclosed software pipeline may update the first and second tasks of the schedule to reflect the changes to their respective status indications (e.g., by updating the schedule data for the first and second tasks that comprised their respective status indications). Various other examples may also exist.

At block 510, the back-end computing platform 102 installed with the disclosed software pipeline may transmit the updated schedule to the client device 104, for instance, via the communication path 106.

At block 512, the client device 104 may receive the given updated schedule from the back-end computing platform 102 installed with the disclosed software pipeline, for instance, via the communication path 106.

At block 514, the client device 104 may present the given summary of the one or more tasks, for instance, via the GUI of the client-side software running on the client device 104.

FIG. 6 shows one possible example of schedule updates that may be generated by the disclosed software pipeline. In particular, an example schedule 600 of a construction project is shown that includes four tasks: (i) "Install Floor Insulation," (ii) "Erect Structural Steel," (iii) "Excavate Foundation," and (iv) "Install Electrical." As shown, the tasks have respective assignees, status indications (shown as "Status" in the schedule 600), start dates, and end dates.

FIG. 6 also shows an updated version 602 of the schedule 600 that has been generated in accordance with the disclosed software pipeline. Various attributes of the tasks of the schedule 600 have been updated in the updated schedule 602.

For instance, the status indication of the task "Install Floor Insulation" has been updated from "Initiated" to "In Progress" and the start date has been updated from "N/A" to "Jan. 25, 2024." In line with the previous discussion, the back-end computing platform 102 installed with the disclosed software pipeline may perform this update based on loaded log data indicating that work on installing the floor insulation began on Jan. 25, 2024.

Further, as shown, the status indication of the task "Erect Structural Steel" has been updated from "Ready For Review" to "Complete" and the end date has been updated from "N/A" to "Feb. 5, 2024." In line with the previous discussion, the back-end computing platform 102 installed with the disclosed software pipeline may perform this update based on loaded log data indicating that erecting structural steel was completed on Feb. 5, 2024.

Further yet, as shown, the status indication of the task "Excavate Foundation" has been updated from "In Progress" to "Complete" and the end date has been updated from "N/A" to "Feb. 5, 2024." In line with the previous discussion, the back-end computing platform 102 installed with the disclosed software pipeline may perform this update based on loaded log data indicating that work on excavating the foundation has been reviewed (e.g., in implementations where advancing through the "Ready For Review" status is a requirement for achieving the "Complete" status) and then was completed on Feb. 5, 2024.

Further yet, as shown, the task "Install Electrical" was not updated, e.g., because there was no loaded log data referencing the "Install Electrical" task.

Figure 7:
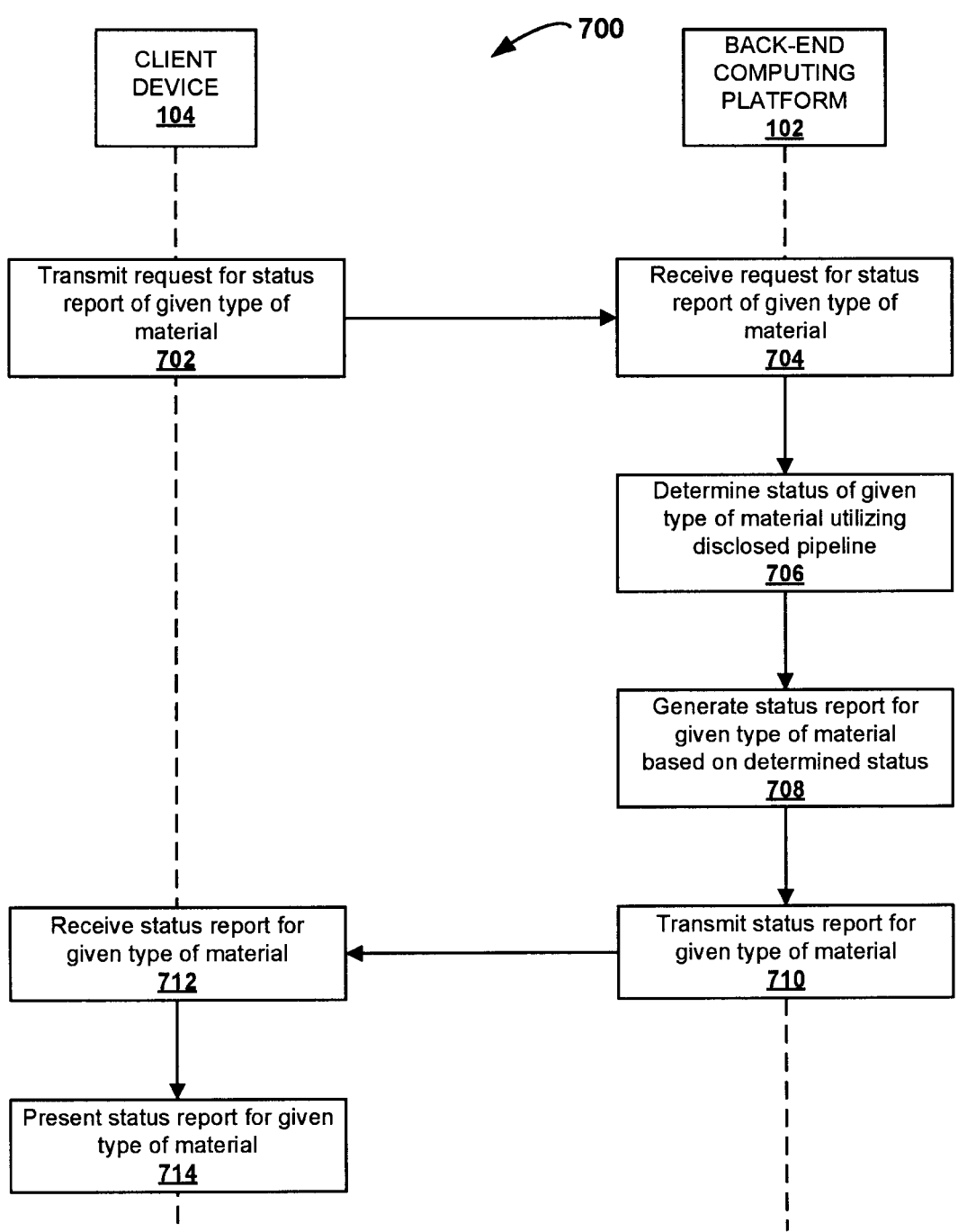
FIG. 7 depicts a flow diagram of an example process that may be carried out in accordance with the disclosed software technology for generating insights related to progress tracking.

Turning now to FIG. 7, a flow diagram 700 is depicted showing an example process that may be carried out in accordance with the disclosed software pipeline for generating insights related to progress tracking. As shown, certain functions of the flow diagram 700 are performed by the client device 104, whereas other functions of the flow diagram 300 are performed by the back-end computing platform 102. However, it should be understood that functions of the flow diagram 700 may be performed by various other computing devices. Further, the flow diagram 700 is at least partially intended to further expound on various of the functions previously described with respect to the disclosed software pipeline, e.g., as in the description of FIG. 2, as well as to show an illustrative example of how said functions may be performed within the context of a user of the client device 104 interacting with the disclosed software pipeline.

Starting at block 702, the client device 104 may transmit a request for the back-end computing platform 102 to provide a status report of a given type of material to be utilized for a construction project. In line with the previous discussion, the request may be used by the back-end platform 102 to define the prompt that is provided to the LLM as input data, and may include various types of information to enable the back-end computing platform 102 installed with the disclosed software pipeline to provide the status report of the given type of material.

One type of information that may be included in the request may be information identifying the given type of material. Another type of information that may be included in the request may be information identifying what form the status report is to take for the given type of material (e.g., quantity delivered, delivery timeline, quantity installed, installation timeframe, etc.). Yet another type of information that may be included in the request may be information identifying a periodic frequency, which the back-end computing platform 102 installed with the disclosed software pipeline may use in automatically checking loaded source data to determine whether to update the status report for the given type of material.

The request may include various other types of information as well.

In practice, the client device 104 may transmit the request based on receiving user input on the client device 104 that defines the request. For instance, a user of the client device 104 may interact with a GUI provided by client-side software running on the client device 104 (e.g., by typing the request into a textbox) to input the request and/or may provide audio input to the client device 104, among other possibilities. Further, the client device 104 may transmit the request to the back-end computing platform 102 installed with the disclosed software pipeline via the communication path 106.

At block 704, the back-end computing platform 102 installed with the disclosed software pipeline may receive the request for the status report for the given type of material from the client device 104, e.g., via the communication path 106.

At block 706, the back-end computing platform 102 may determine the status of the given type of material utilizing the disclosed software pipeline. In line with the previous discussion, this may involve performing operations of the disclosed software pipeline, as described above with respect to FIG. 2.

In some implementations, performing operations of block 706 may involve loading source data (block 202 of FIG. 2) and preprocessing the loaded source data (block 204 of FIG. 2) in response to receiving the request at block 704. However, in other implementations, the back-end computing platform 102 installed with the disclosed software pipeline may perform operations of blocks 202 and 204 prior to performing the operations of block 706. For instance, the back-end computing platform 102 installed with the disclosed software pipeline may load source data and preprocess the loaded source data according to a periodic frequency, as previously described.

In any case, performing operations of block 706 may further involve determining, via the LLM, the status of the given type of material, utilizing the disclosed software pipeline, as previously described with respect to block 206.

In line with the previous discussion, the back-end computing platform 102 installed with the disclosed software pipeline may then perform any post-processing operations necessary to generate the one or more insights comprising an indication of the determined status of the given type of material.

Although one or more of the operations of block 706 have been described as being at least partially based on the request received at block 704, in at least one implementation, the back-end computing platform 102 installed with the disclosed software technology may be configured to perform operations of block 706 without receiving a request to provide the status report for the given type of material. For instance, the back-end computing platform 102 installed with the disclosed software pipeline may be configured to determine the status of the given type of material automatically, e.g., based on a periodic frequency.

At block 708, the back-end computing platform 102 installed with the disclosed software pipeline may generate the status report for the given type of material based on the determined status of the given type of material. In line with the previous discussion, the LLM may generate insights such as (i) an indication of a quantity of the given type of material that was delivered, (ii) an indication of a delivery timeline of the given type of material, (iii) an indication of a quantity of the given type of material that was installed, and/or (iv) an indication of an installation timeline of the given type of material. Based on these generated insights, the back-end computing platform 102 installed with the disclosed software pipeline may generate a status report for the given type of material based on one or more of the insights generated by the LLM. Various other examples may also exist.

At block 710, the back-end computing platform 102 installed with the disclosed software pipeline may transmit the status report for the given type of material to the client device 104, for instance, via the communication path 106.

At block 712, the client device 104 may receive the status report for the given type of material from the back-end computing platform 102 installed with the disclosed software pipeline, for instance, via the communication path 106.

At block 714, the client device 104 may present the status report for the given type of material, for instance, via a GUI of the disclosed software running on the client device 104.

FIG. 8 shows one possible example of a status report 800 for a given type of materials that may be generated in accordance with the disclosed software pipeline. As shown, the given type of materials takes the form of materials that are to be utilized for electrical tasks of a construction project, and the status report 800 includes statuses for the following materials: "Wiring," "Breaker Panel," "Light Fixtures," and "Outlets and Switches," each of which may be utilized for electrical tasks of a construction project. Further, as shown, the status report 800 includes multiple statuses for each of the materials.

The back-end computing platform 102 installed with the disclosed software pipeline may generate the status report 800 in line with the discussion above. For instance, the back-end computing platform 102 installed with the disclosed software pipeline may generate the status report 800 in response to receiving a request for a status report for a given type of materials taking the form of materials that are to be utilized for electrical tasks of a construction project.

Figure 9:
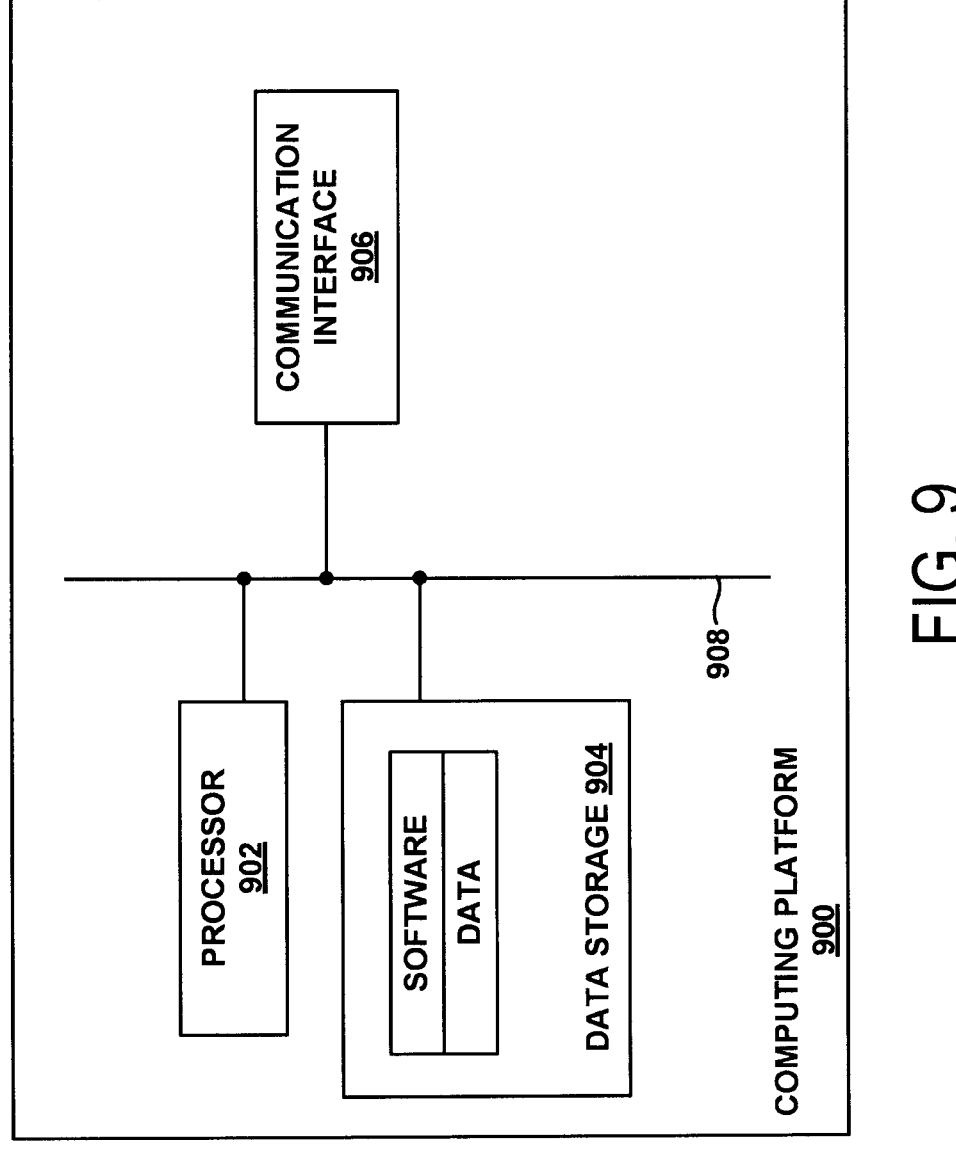
FIG. 9 depicts an example computing platform that may be configured to carry out one or more of the functions of the present disclosure.

Turning now to FIG. 9, a simplified block diagram is provided to illustrate some structural components that may be included in an example computing platform 900 that may be configured to perform the server-side functions disclosed herein. At a high level, the example computing platform 900 may generally comprise any one or more computer systems (e.g., one or more servers) that collectively include one or more processors 902, data storage 904, and one or more communication interfaces 906, each of which may be communicatively linked by a communication link 908 that may take the form of a system bus, a communication network such as a public, private, or hybrid cloud, or some other connection mechanism. Each of these components may take various forms.

For instance, the one or more processors 902 may comprise one or more processor components, such as one or more central processing units (CPUs), graphics processing units (GPUs), application-specific integrated circuits (ASICs), digital signal processor (DSPs), and/or programmable logic devices such as field programmable gate arrays (FPGAs), among other possible types of processing components. In line with the discussion above, it should also be understood that the one or more processors 902 could comprise processing components that are distributed across a plurality of physical computing devices connected via a network, such as a computing cluster of a public, private, or hybrid cloud.

In turn, the data storage 904 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 904 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 9, the data storage 904 may be capable of storing both (i) program instructions that are executable by the one or more processors 902 such that the example computing platform 900 is configured to perform any of the various functions disclosed herein (including but not limited to any of the server-side functions discussed above), and (ii) data that may be received, derived, or otherwise stored by the example computing platform 900.

The one or more communication interfaces 906 may comprise one or more interfaces that facilitate communication between the example computing platform 900 and other systems or devices, where each such interface may be wired and/or wireless and may communicate according to any of various communication protocols. As examples, the one or more communication interfaces 906 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the example computing platform 900 may additionally have an Input/Output (I/O) interface that includes or provides connectivity to I/O components that facilitate user interaction with the example computing platform 900, such as a keyboard, a mouse, a trackpad, a display screen, a touch-sensitive interface, a stylus, a virtual-reality headset, and/or one or more speaker components, among other possibilities.

It should be understood that the example computing platform 900 is one example of a computing platform that may be used with the examples described herein. Numerous other arrangements are possible and contemplated herein. For instance, in other examples, the example computing platform 900 may include additional components not pictured and/or more or less of the pictured components.

Figure 10:
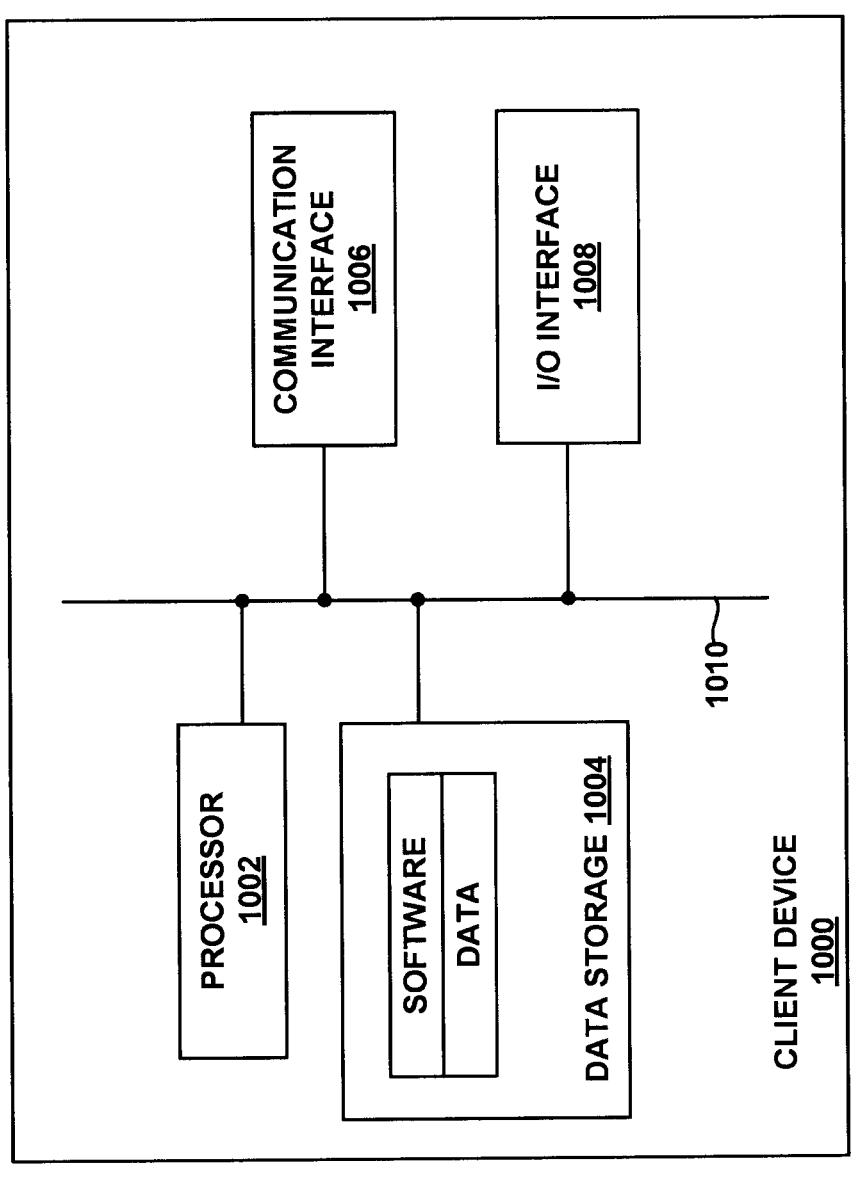
FIG. 10 depicts an example client device that may be configured to carry out one or more of the functions of the present disclosure.

Turning next to FIG. 10, a simplified block diagram is provided to illustrate some structural components that may be included in an example client device 1000 that may be configured to perform some the client-side functions disclosed herein. At a high level, the example client device 1000 may include one or more processors 1002, data storage 1004, one or more communication interfaces 1006, and an I/O interface 1008, each of which may be communicatively linked by a communication link 1010 that may take the form a system bus and/or some other connection mechanism. Each of these components may take various forms.

For instance, the one or more processors 1002 of the example client device 1000 may comprise one or more processor components, such as one or more CPUs, GPUs, ASICs, DSPS, and/or programmable logic devices such as FPGAs, among other possible types of processing components.

In turn, the data storage 1004 of the example client device 1000 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 10, the data storage 1004 may be capable of storing both (i) program instructions that are executable by the one or more processors 1002 of the example client device 1000 such that the example client device 1000 is configured to perform any of the various functions disclosed herein (including but not limited to any of the client-side functions discussed above), and (ii) data that may be received, derived, or otherwise stored by the example client device 1000.

The one or more communication interfaces 1006 may comprise one or more interfaces that facilitate communication between the example client device 1000 and other systems or devices, where each such interface may be wired and/or wireless and may communicate according to any of various communication protocols. As examples, the one or more communication interfaces 1006 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 1008 may generally take the form of (i) one or more input interfaces that are configured to receive and/or capture information at the example client device 1000 and (ii) one or more output interfaces that are configured to output information from the example client device 1000 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of the I/O interface 1008 may include or provide connectivity to output components such as a display screen and/or an audio speaker, among other possibilities.

It should be understood that the example client device 1000 is one example of a client device that may be used with the examples described herein. Numerous other arrangements are possible and contemplated herein. For instance, in other examples, the example client device 1000 may include additional components not pictured and/or more or fewer of the pictured components.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A computing platform comprising:
at least one processor;
at least one non-transitory computer-readable medium; and
program instructions stored on the at least one non-transitory computer-readable medium that, when executed by the at least one processor, cause the computing platform to:
receive, from a client device, an indication of a user request for one or more types of insights related to progress tracking of a construction project having a schedule that includes a set of tasks, wherein the one or more types of insights comprise at least one of (i) one or more textual summaries of the set of tasks, or (ii) a status of a given type of material associated with the set of tasks, and wherein the user request is input via a graphical user interface (GUI) of the client device; and
based on the received indication of the user request:
load source data comprising (i) a set of log entries of the construction project and (ii) a representation of the schedule of the construction project, wherein each log entry in the set of log entries has an associated log entry type;
preprocess the source data by:
determining a set of log entry types that correspond to the one or more types of insights;
based on an evaluation of the set of log entries and the set of tasks, determining, from the set of log entries, a subset of log entries that each (i) has an associated log entry type included in the set of log entry types and (ii) corresponds to at least one task in the set of tasks; and
generating an input data structure according to a schema for input into a large language model (LLM), wherein the input data structure comprises a request to generate the one or more types of insights and a log dataset that is generated by, for each log entry in the subset of log entries:
extracting log data from a log entry according to the associated log entry type of the log entry; and
encoding the extracted log data from the log entry into the log dataset according to the schema;
provide the generated input data structure as input to the LLM;
obtain an output of the LLM that is responsive to the user request and comprises one or more insights related to the progress tracking of the construction project;
format the output of the LLM into a form that is usable by the client device; and transmit the formatted output of the LLM to the client device and thereby cause the formatted output of the LLM to be presented via the GUI of the client device.

2. The computing platform of claim 1, wherein the set of tasks comprises tasks related to a given location of the construction project.

3. The computing platform of claim 1, wherein the set of tasks comprises tasks related to a given trade.

4. The computing platform of claim 1, wherein the one or more types of insights further comprise predicted status indications for the set of tasks.

5. The computing platform of claim 1, wherein the one or more types of insights further comprise predicted start and end dates for the set of tasks.

6. The computing platform of claim 1, wherein the one or more types of insights further comprise a proposed modification to the schedule.

7. The computing platform of claim 1, further comprising program instructions stored on the at least one non-transitory computer-readable medium that, when executed by the at least one processor, cause the computing platform to:
perform one or more actions with respect to the one or more insights, wherein the one or more actions comprise one or more of (i) storing the one or more insights for future access, (ii) updating one or more schedules of the construction project based on the one or more insights, or (iii) generating documentation that explains how the one or more insights were generated by the LLM.

8. A non-transitory computer-readable medium, wherein the non-transitory computer-readable medium is provisioned with program instructions that, when executed by at least one processor, cause a computing platform to:
receive, from a client device, an indication of a user request for one or more types of insights related to progress tracking of a construction project having a schedule that includes a set of tasks, wherein the one or more types of insights comprise at least one of (i) one or more textual summaries of the set of tasks, or (ii) a status of a given type of material associated with the set of tasks, and wherein the user request is input via a graphical user interface (GUI) of the client device; and
based on the received indication of the user request:
load source data comprising (i) a set of log entries of the construction project and (ii) a representation of the schedule of the construction project, wherein each log entry in the set of log entries has an associated log entry type;
preprocess the source data by:
determining a set of log entry types that correspond to the one or more types of insights:
based on an evaluation of the set of log entries and the set of tasks, determining, from the set of log entries, a subset of log entries that each (i) has an associated log entry type included in the set of log entry types and (ii) corresponds to at least one task in the set of tasks; and
generating an input data structure according to a schema for input into a large language model (LLM), wherein the input data structure comprises a request to generate the one or more types of insights and a log dataset that is generated by, for each log entry in the subset of log entries:
extracting log data from a log entry according to the associated log entry type of the log entry; and encoding the extracted log data from the log entry into the log dataset according to the schema;

provide the generated input data structure as input to the LLM;

obtain an output of the LLM that is responsive to the user request and comprises one or more insights related to the progress tracking of the construction project;

format the output of the LLM into a form that is usable by the client device; and transmit the formatted output of the LLM to the client device and thereby cause the formatted output of the LLM to be presented via the GUI of the client device.

9. The non-transitory computer-readable medium of claim 8, wherein the set of tasks comprises tasks related to a given location of the construction project.

10. The non-transitory computer-readable medium of claim 8, wherein the set of tasks comprises tasks related to a given trade.

11. The non-transitory computer-readable medium of claim 8, wherein the one or more types of insights further comprise predicted status indications for the set of tasks.

12. The non-transitory computer-readable medium of claim 8, wherein the one or more types of insights further comprise predicted start and end dates for the set of tasks.

13. The non-transitory computer-readable medium of claim 8, wherein the one or more types of insights further comprise a proposed modification to the schedule.

14. The non-transitory computer-readable medium of claim 8, wherein the non-transitory computer-readable medium is further provisioned with program instructions that, when executed by at least one processor, cause the computing platform to:

perform one or more actions with respect to the one or more insights, wherein the one or more actions comprise one or more of (i) storing the one or more insights for future access, (ii) updating one or more schedules of the construction project based on the one or more insights, or (iii) generating documentation that explains how the one or more insights were generated by the LLM.

15. A method implemented by a computing platform, the method comprising:

receiving, from a client device, an indication of a user request for one or more types of insights related to progress tracking of a construction project having a schedule that includes a set of tasks, wherein the one or more types of insights comprise at least one of (i) one or more textual summaries of the set of tasks, or (ii) a status of a given type of material associated with the set of tasks, and wherein the user request is input via a graphical user interface (GUI) of the client device; and based on the received indication of the user request:

loading source data comprising (i) a set of log entries of the construction project and (ii) a representation of the schedule of the construction project, wherein each log entry in the set of log entries has an associated log entry type;

preprocessing the source data by:

determining a set of log entry types that correspond to the one or more types of insights:

based on an evaluation of the set of log entries and the set of tasks, determining, from the set of log entries, a subset of log entries that each (i) has an associated log entry type included in the set of log entry types and (ii) corresponds to at least one task in the set of tasks; and generating an input data structure according to a schema for input into a large language model (LLM), wherein the input data structure comprises a request to generate the one or more types of insights and a log dataset that is generated by, for each log entry in the subset of log entries:

extracting log data from a log entry according to the associated log entry type of the log entry; and encoding the extracted log data from the log entry into the log dataset according to the schema;

providing the generated input data structure as input to the LLM;

obtaining an output of the LLM that is responsive to the user request and comprises one or more insights related to the progress tracking of the construction project;

formatting the output of the LLM into a form that is usable by the client device; and transmitting the formatted output of the LLM to the client device, thereby causing the formatted output of the LLM to be presented via the GUI of the client device.

16. The method of claim 15, wherein the set of tasks comprises tasks related to a given location of the construction project.

17. The method of claim 15, wherein the set of tasks comprises tasks related to a given trade.

18. The method of claim 15, wherein the one or more types of insights further comprise predicted status indications for the set of tasks.

19. The method of claim 15, wherein the one or more types of insights further comprise predicted start and end dates for the set of tasks.

20. The method of claim 15, wherein the one or more types of insights further comprise a proposed modification to the schedule.

* * * * *